United States Patent
Hamsici et al.

(10) Patent No.: US 9,230,187 B2
(45) Date of Patent: Jan. 5, 2016

(54) SYSTEM AND METHOD FOR ROBUST ESTIMATION OF COLOR DEPENDENT MEASUREMENTS

(71) Applicant: QUALCOMM Incorporated, San Diego, CA (US)

(72) Inventors: Onur Canturk Hamsici, San Diego, CA (US); John Hyunchul Hong, San Clemente, CA (US); Chong Uk Lee, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 21 days.

(21) Appl. No.: 13/794,202

(22) Filed: Mar. 11, 2013

(65) Prior Publication Data

US 2013/0308852 A1    Nov. 21, 2013

Related U.S. Application Data

(60) Provisional application No. 61/611,513, filed on Mar. 15, 2012.

(51) Int. Cl.
*G06K 9/62* (2006.01)
*G06K 9/46* (2006.01)
*G01J 3/46* (2006.01)

(52) U.S. Cl.
CPC ................ *G06K 9/4652* (2013.01); *G01J 3/46* (2013.01); *G01J 3/462* (2013.01)

(58) Field of Classification Search
None
See application file for complete search history.

(56) References Cited

U.S. PATENT DOCUMENTS

| 8,368,978 | B2 | 2/2013 | Qiao |
| 8,611,677 | B2 * | 12/2013 | Das et al. ...................... 382/225 |
| 8,762,659 | B2 * | 6/2014 | Date et al. ..................... 711/156 |
| 2003/0123072 | A1 * | 7/2003 | Spronk .......................... 358/1.9 |
| 2006/0227347 | A1 * | 10/2006 | Allen ............................. 358/1.9 |
| 2008/0086511 | A1 * | 4/2008 | Takao et al. ................. 707/104.1 |
| 2009/0185723 | A1 * | 7/2009 | Kurtz et al. ................... 382/118 |
| 2009/0257663 | A1 * | 10/2009 | Luo et al. ...................... 382/224 |
| 2010/0097622 | A1 | 4/2010 | Qiao et al. |
| 2011/0267629 | A1 | 11/2011 | Fan et al. |
| 2012/0019843 | A1 | 1/2012 | Kishimoto |
| 2012/0044540 | A1 | 2/2012 | Dalal et al. |

OTHER PUBLICATIONS

International Search Report and Written Opinion—PCT/US2013/030557—ISA/EPO—Oct. 15, 2013.
Partial International Search Report—PCT/US2013/030557—International Search Authority European Patent Office Jul. 5, 2013.

* cited by examiner

*Primary Examiner* — Thomas Conway
(74) *Attorney, Agent, or Firm* — Knobbe, Martens, Olson & Bear LLP

(57) ABSTRACT

Methods, devices, and computer program products for robust estimation of color-dependent measurements are described herein. In one aspect, a method for generating a reference color grid that may be placed beside a color-dependent measuring device is disclosed. The reference color grid may contain a number of colors which enable a mapping from the color space of a testing device to a reference color space. This mapping may allow a function that is able to determine an estimate of a color-dependent measurement based on a color in the reference color space to be used. In another aspect, a method for robust estimation of color-dependent measurement using a reference color guide is disclosed.

29 Claims, 14 Drawing Sheets

(a) ALT (b) AST (a) ALT (b) AST

US 9,230,187 B2

SYSTEM AND METHOD FOR ROBUST ESTIMATION OF COLOR DEPENDENT MEASUREMENTS

CROSS-REFERENCE TO RELATED APPLICATIONS

This application claims priority to U.S. Provisional Application No. 61/611,513 filed on Mar. 15, 2012, the entirety of which is hereby incorporated by reference.

FIELD

The present application relates generally to estimation of color dependent measurements, and more specifically to systems, methods, and devices for robust estimation of color dependent measurements.

BACKGROUND

Accurate color measurements may be important in a variety of fields. For example, color-based measuring devices may be used to measure a large number of things, such as for a wide variety of medical or other purposes. Color-based measuring devices may include paper-based microfluidic devices which allow diagnosis of diseases based on concentration estimates of a substance in a fluid, such as in patient blood. These paper-based devices may be less expensive and more precise than prior techniques, and it may therefore be desirable to use these techniques.

However, in the use of color-based measuring devices, and other colorimetric systems, it may be important to accurately measure colors. For example, in a paper-based microfluidic device that is used to diagnose diseases, it may be important that the color of the final samples, and thus a concentration estimate of the samples be measured accurately. Further, it may be desirable for an individual to be able to measure the color of a sample or apparatus, without having to consult with a medical professional or purchase expensive medical devices. Thus, systems and methods of robust estimation of color-dependent measurements are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include robust estimation of color-dependent measurements.

In one aspect, a method of using a color grid to estimate a color-dependent measurement is disclosed, the method comprising receiving a learned function and a reference color guide; receiving an image containing a color guide and a colored device configured for color-dependent measurement; mapping the received image of the color guide to the reference color guide; determining a location in a reference color space corresponding to the image of the colored device, the location based at least in part on the mapping of the received image of the color guide to the reference color guide; and determining an estimate of a color-dependent measurement, based at least in part on the location in the reference color space and on the learned function.

In one aspect, a non-transitory, computer readable medium comprising instructions that when executed cause a processor in a device to perform a method of using a color guide to estimate a color-dependent measurement is disclosed. The method comprises receiving a learned function and a reference color guide; receiving an image containing a color guide and a colored device configured for color-dependent measurement; mapping the received image of the color guide to the reference color guide; determining a location in a reference color space corresponding to the image of the colored device, the location based at least in part on the mapping of the received image of the color guide to the reference color guide; and determining an estimate of a color-dependent measurement, based at least in part on the location in the reference color space and on the learned function.

In another aspect, a device is disclosed, the device comprising: means for receiving a learned function and a reference color guide; means for receiving an image containing a color guide and a colored device configured for color-dependent measurement; means for mapping the received image of the color guide to the reference color guide; means for determining a location in a reference color space corresponding to the image of the colored device, the location based at least in part on the mapping of the received image of the color guide to the reference color guide; and means for determining an estimate of a color-dependent measurement, based at least in part on the location in the reference color space and on the learned function.

In one aspect, a device is disclosed, the device comprising a memory; and a processor configured to: receive a learned function and a reference color grid from the memory; and receive an image containing a color grid and a colored device configured for color-dependent measurement; map the received image of the color grid to the reference color grid; determine a location in a reference color space corresponding to the image of the colored device, the location based at least in part on the mapping of the received image of the color grid to the reference color grid; and determine an estimate of a color-dependent measurement, based at least in part on the location in the reference color space and on the learned function.

In some aspects, an electronic method of generating a color grid for robust estimation of color-dependent measurements is disclosed. The method comprises receiving a training set containing a plurality of elements, each element comprising a known measurement and a color of a measuring device in a reference color space; learning a function to estimate a measurement based on a color in the reference color space, the learned function based, at least in part, on the received training set; and creating a reference color grid containing a number of cells for a color guide, the reference color grid configured to sample the reference color space with respect to the learned function and the distribution of colors within the training set.

In another aspect a device is disclosed, comprising a memory; and a processor configured to: receive a training set containing a plurality of elements from the memory, each element comprising a known measurement and a color of a measuring device in a reference color space; learn a function to estimate a measurement based on a color in the reference color space, the learned function based, at least in part, on the received training set; and create a reference color grid containing a number of cells for a color guide, the reference color grid configured to sample the reference color space with respect to the learned function and the distribution of colors within the training set.

DETAILED DESCRIPTION

Figure 1:
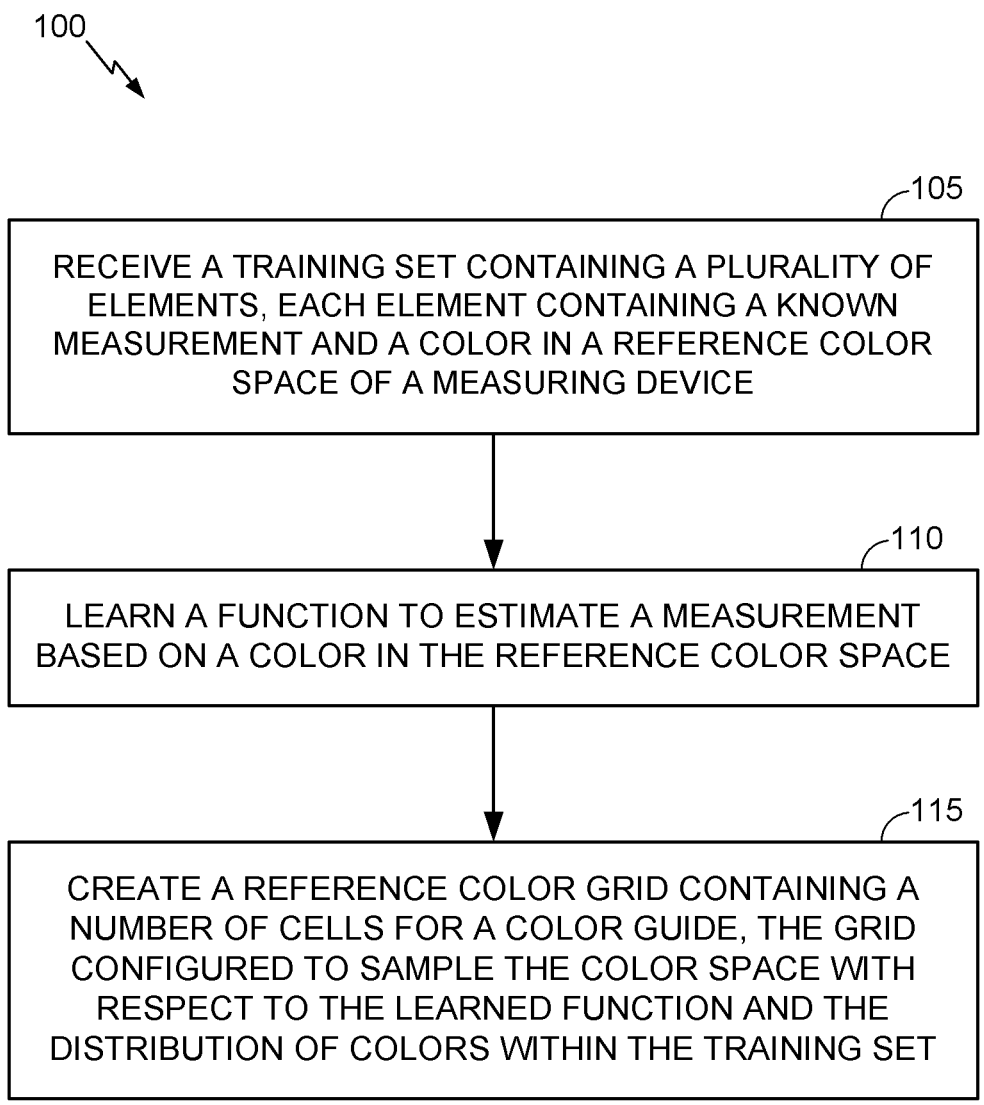
FIG. 1 is an illustration of a method for creating a reference color grid that may be used in a technique for robust color estimation.

Embodiments relate to methods and systems for accurately analyzing the color of an object with respect to a learned color guide. For example, in one embodiment relating to a measurement of sample concentration levels based on color, the system first learns a function that estimates the concentration level of an analyte in a sample from color variations in a training set in a reference color space. Next, a color guide is designed that sufficiently cover the color variations with respect to the learned function in the reference color space. The designed color guide can establish a correspondence between the reference color space and the color space of a biological sample that is captured under a different illumination. In testing, the pixels from the sample are mapped to the reference color space and the concentration levels in each sample are estimated using the learned function. In general, embodiments of the system can efficiently run on mobile phones and be used to generate a color guide by using any printer and scanner pairs. This flexibility may allow scientific researchers to design mobile color readers specific to their applications.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Embodiments relate to systems, methods, and devices for robust estimation of color-dependent measurements. Such color measurements may be important in a variety of fields. For example, developments in color-based measuring devices such as paper-based microfluidic devices allow diagnosis of diseases with concentration estimation of a substance in patient blood using inexpensive and reproducible paper-based devices. These paper-based devices may be less expensive and more precise than prior techniques. However, it may be important that the color of the paper-based microfluidic device can be measured accurately.

It may be difficult to estimate the color of an object, such as a paper-based microfluidic device, for a variety of reasons. For example, there may be variations in color illumination, variations of surface reflectance of the surface of a device, and variations due to characteristics of a capture device. For example, lighting in a room may vary, and different capture devices, such as digital cameras on a mobile device, may capture colors differently from each other. Robustness to these variations, i.e. of color constancy, is a difficult problem in computer vision research, as the problem is under constrained. Therefore, some solutions cannot be used in fields that require precision, such as in color estimation of a color-dependent device. Thus, systems and methods of robust estimation of color-dependent measurements are disclosed herein. Color estimation will also have applicability beyond paper-based medical products, and in a general sense, may form an important aspect of mobile computing wherein the accurate knowledge of color content in what is seen through an imaging device, such as a digital camera on a mobile phone, may become an important and valuable parameter.

FIG. 1 is an illustration of a method 100 for creating a reference color grid that may be used in a technique for robust color estimation. This method may be done on an electronic device, such as a computer.

The method 100 starts at a block 105, wherein the electronic device receives a training set containing a plurality of elements, each element containing a known measurement and a color in a reference space of a measuring device. The known measurement may be a measurement of a concentration in a sample. The known measurement may be a measurement that is known to be accurate. For example, the measurement may be made by another measuring device that is known to provide an accurate measurement, or may be a measurement of a sample whose measured value is otherwise known. The color in a reference space of a measuring device may be a color of a color-based measuring device that has been exposed to the sample. For example, the color may be the color of a paper-based microfluidic device that has been exposed to the sample. For example, the microfluidic device may be a paper-based microfluidic device that changes color according to a concentration level of ALT and AST enzymes in a patient's blood, to determine liver function. In some aspects, the means for receiving a training set containing a plurality of elements, each element comprising a known measurement and a color of a measuring device in a reference color space may comprise a receiver.

Such a paper-based microfluidic device may include those developed by Diagnostics For All (Cambridge, Mass.). In some aspects, the color may be one or more colors. For example, if the device is a paper-based microfluidic device that changes color according to a concentration level of ALT and AST enzymes, the color may be two colors, one for each of ALT and AST enzymes. These enzymes may be measured as a test of liver function in a patient. The color may be in a reference color space of a measuring device, such as being a photograph or other image taken in a known setting on a known device. For example, the known measurement may be a known measurement of a concentration in a sample, and the color may be a color in a digital image of a paper-based microfluidic device that has been exposed to the sample. The digital image may be taken in a known setting and known conditions on a known device, such as a digital camera or other imaging equipment. A scanner may be used to create a known setting and condition in order to capture a color in a reference color space. A scanner may be able to create and reproduce identical settings accurately and easily, which may be beneficial for determining a color in a reference color space. The color may be expressed in any color format, in any way. For example, the color may be in the RGB color space. The color may include a value for each of red, blue and green, the value between 0 and 255. The color may be an average color of a cell of a color-based measuring device. For example, the color may be based on an image of a color-based measuring device, in which the measurement area of the image is determined, and the colors from this area are averaged in order to determine the color in the reference color space.

The process 100 then moves to a block 110, wherein the electronic device learns a function to estimate a measurement based on a color in the reference color space. For example, a learned function may be a function $f(x)$, where x is a color in the reference color space. This color may be expressed in any number of ways, such as in an RGB or other color format. The function $f(x)$ may be generated in any number of ways, based upon the training set which includes a number of matched color and measurement pairs. The function $f(x)$ may be able to accurately predict a measurement, based upon a color x in the reference color space. It may be beneficial to use a large training set, in order to allow $f(x)$ to be as accurate as possible. In some aspects, the means for learning a function to estimate a measurement based on a color in the reference color space, the learned function based, at least in part, on the received training set may comprise a processor configured to learn a function.

After the device has learned the appropriate function, the process moves to a block 115, wherein the electronic device creates a reference color grid containing a number of cells for a color guide, the grid configured to sample the color space with respect to the learned function and the distribution of colors within the training set. The reference color grid may contain any number of colors. The reference color grid may be designed so that a printed reference color grid may be placed next to a color-based measuring device in an image, to allow a comparison between colors on the reference color grid and the color of a color-based measuring device. The reference color grid may be designed so that a testing device, such as a mobile phone equipped with a digital camera, can take an image of a printed reference color grid and a warping function $W(q)$ may be calculated. The warping function $W(q)$ may return a color in the reference color space, and q may be a color in the color space of the testing device. This formula may be used to translate a color from the testing color space to the reference color space, in order to allow the use of the learned function $f(x)$. In some aspects, the means for creating a reference color grid containing a number of cells for a color guide, the reference color grid configured to sample the reference color space with respect to the learned function and the distribution of colors within the training set may comprise processor configured to create a reference color grid.

A number of techniques may be used to create a reference color grid. For example, the electronic device may determine a distribution of colors in the reference color space found in the training set. The electronic device may, based upon the distribution of colors, identify an ideal grid that densely samples the distribution of the pixels in the color space. The ideal grid may be printed out using a printer onto paper or another medium, and this printed ideal color grid may be scanned and compared to the original ideal grid. This comparison may be useful, as it may allow a determination of which colors may print out most accurately. Based on the printed and scanned ideal color grid, a subset of colors may be chosen for a reference color grid. In some aspects, this subset of colors may be chosen to best span the reference color space or the portion of the reference color space that contains colors found in color-based measuring devices, and may be chosen using colors that may print and scan most accurately. The reference color grid may be designed so that it can be printed out, and placed next to a color-based measuring device in a digital image, so that an electronic device may compare the colors of the reference color grid to the colors observed in the color-based measuring device. The reference color grid may also be designed so that a testing device may use a captured image of the reference color grid next to a color-based measuring device to map the colors of the testing device to the colors of the reference color space.

In some aspects, the means for providing an ideal color grid for a color guide containing a number of colors in the reference color space may provide a processor configured to create such a grid. In some aspects, the means for printing the ideal color grid may comprise a printer. In some aspects, the means for capturing the printed ideal color grid may comprise a scanner. In some aspects, the means for determining a difference between the colors on the printed and scanned or captured ideal color grid and a distribution of colors on the ideal color grid may comprise a processor configured to determine a difference. In some aspects, the means for selecting a subset of the colors from the printed and captured ideal color grid for the reference color grid based at least in part on a difference between the colors on the printed and captured ideal color grid and the distribution of colors on the ideal color grid may comprise a processor configured to select a subset of colors.

The color guide may be designed with respect to the learned function f(x). For instance, the color guide may include color variations that correspond to invariant concentration level estimates from the learned function, i.e. $f(q1)=f(q2)$ for guide colors (q1 and q2). The color guide may be designed for other types of learned functions, e.g. for a classification function a small number of colors may be sufficient to define the classification boundary. The color guide may be designed to be robust to gamut deformations that are due to production of the physical guide using a printer.

Figure 2:
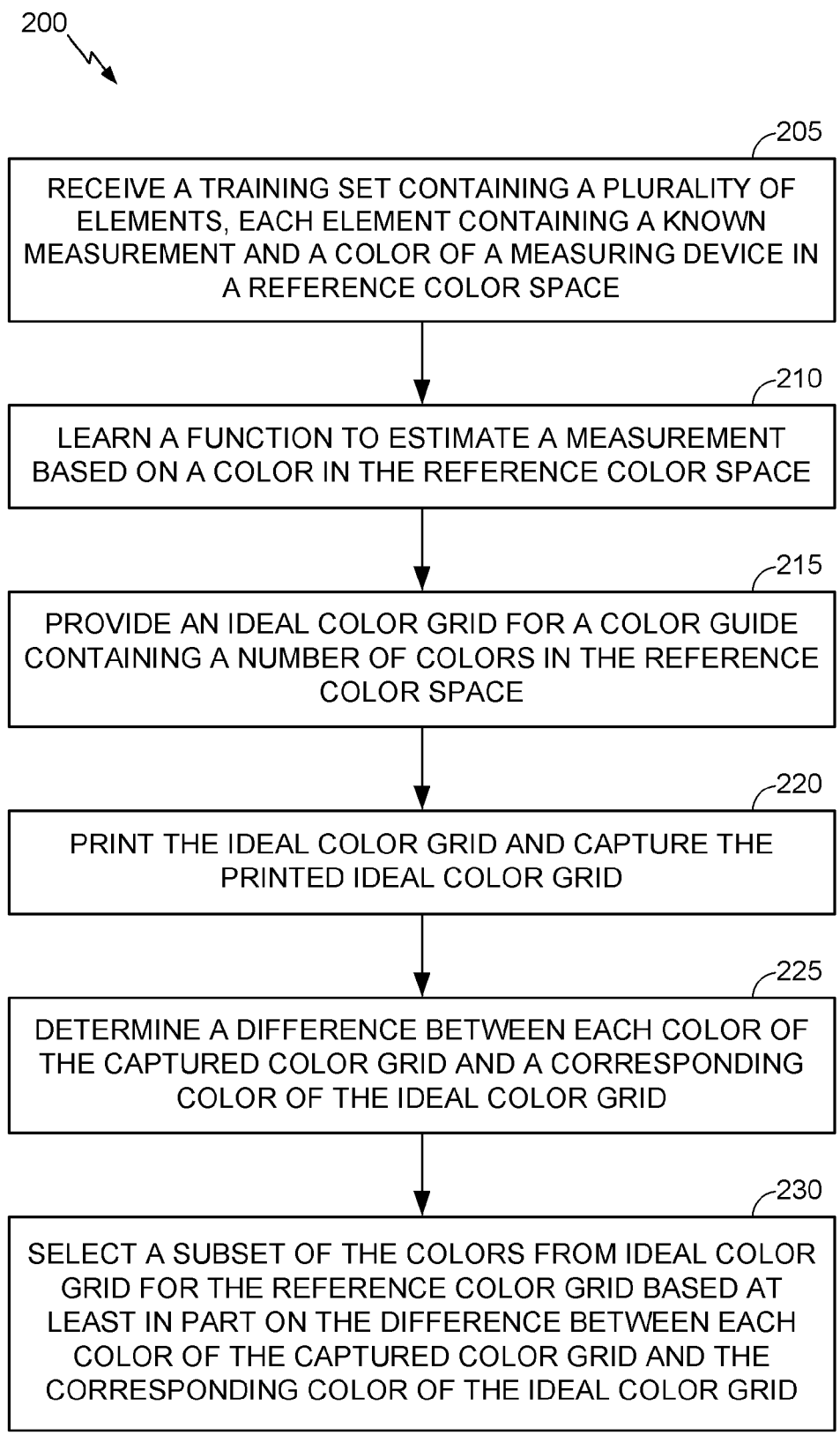
FIG. 2 is an illustration of a method for creating a reference color grid that may be used in a technique for robust color estimation.

FIG. 2 is an illustration of a method 200 for creating a reference color grid that may be used in a technique for robust color estimation. This method 200 may be done on an electronic device, such as a computer or portable electronic device.

Starting at a block 205, the electronic device receives a training set containing a plurality of elements, each element containing a known measurement and a color of a measuring device in a reference color space. As before, the known measurement may be a measurement of a concentration of a sample and the color in the reference space may be a color of a color-based measuring device that has been exposed to the sample. For example, the color may be an average of an area of an image of the color-based measuring device, the area corresponding to a measurement area of the measuring device, and the image obtained in known conditions, such as by a scanner or digital camera. Each color of the training set may be generated in the same reproducible manner. For example, each color may be obtained from a scanned image, by averaging an area of the scanned image that corresponds to a measurement area of a color-based measuring device.

The process 200 then moves to a block 210, wherein the electronic device learns a function to estimate a measurement based on a color in the reference color space. The electronic device may learn a function f(x), where x is a color in the reference color space, and where f(x) is an estimate of a concentration or other measurement based upon the color in the reference color space. The color in the reference color space may be represented in any number of ways, including in an RGB color space or another color space. The reference color space may be the color space used by a reference device, such as a scanner used to find the color of the measuring device in block 205.

At block 215, the electronic device provides an ideal color grid for a color guide containing a number of colors in the reference color space. The ideal color grid may be constructed by the electronic device. For example, the ideal color grid may be constructed based upon the colors observed in the training set. These colors may have been measured by a reference device, and may therefore be in the reference color space. For example, the electronic device may choose colors for the ideal color grid based on the colors in the training set, as measured in the reference color space. These colors may be chosen in order to span the observed colors in the training set.

The ideal color grid may contain any number of colors. The ideal color grid may contain more colors than are desired for a reference color grid.

The process 200 then moves to a block 220, wherein the electronic device prints the ideal color grid and captures the printed ideal color grid. For example, the ideal color grid may be printed using a printer that is capable of printing a large number of color grids, such as an industrial printer. Such a printer may be beneficial in order to distribute printed versions of the reference color grid printed using the same printer. In some aspects, the colors of the printed ideal color grid may be captured and measured using a scanner or other digital imaging device. In some aspects, it may be beneficial to use the same capture device to capture the printed ideal color grid as was used to capture the colors in the reference color space used in the training set. For example, the printed ideal color grid may be captured using the same reference device, such as a scanner, that was used in creating the training set.

Next, at a block 225, the electronic device determines a difference between each color of the captured color grid and a corresponding color of the ideal color grid. This determination may be used to determine which colors of the ideal color grid are most accurately reproduced by the particular printer used to capture the idea color grid. For example, each color on the ideal color grid may be represented as an RGB value. Similarly, each color in the captured color grid may be represented as an RGB value. For each color on the ideal color grid, a difference may be determined between a color on the captured color grid and the corresponding color on the ideal color grid.

The process 200 then moves to a block 230, wherein the electronic device selects a subset of the colors from ideal color grid for a reference color grid based at least in part on the difference between the colors of the captured color grid and the corresponding color of the ideal color grid. In some aspect, a subset of colors may be chosen based on which colors are most accurately reproduced by the printer. In some aspects, the subset of colors may be chosen in order to span the colors of the reference color space that were observed in the colors in the training set. The reference color grid may then be printed and distributed, to be used in a method for robust color estimation using a reference color grid.

Figure 3:
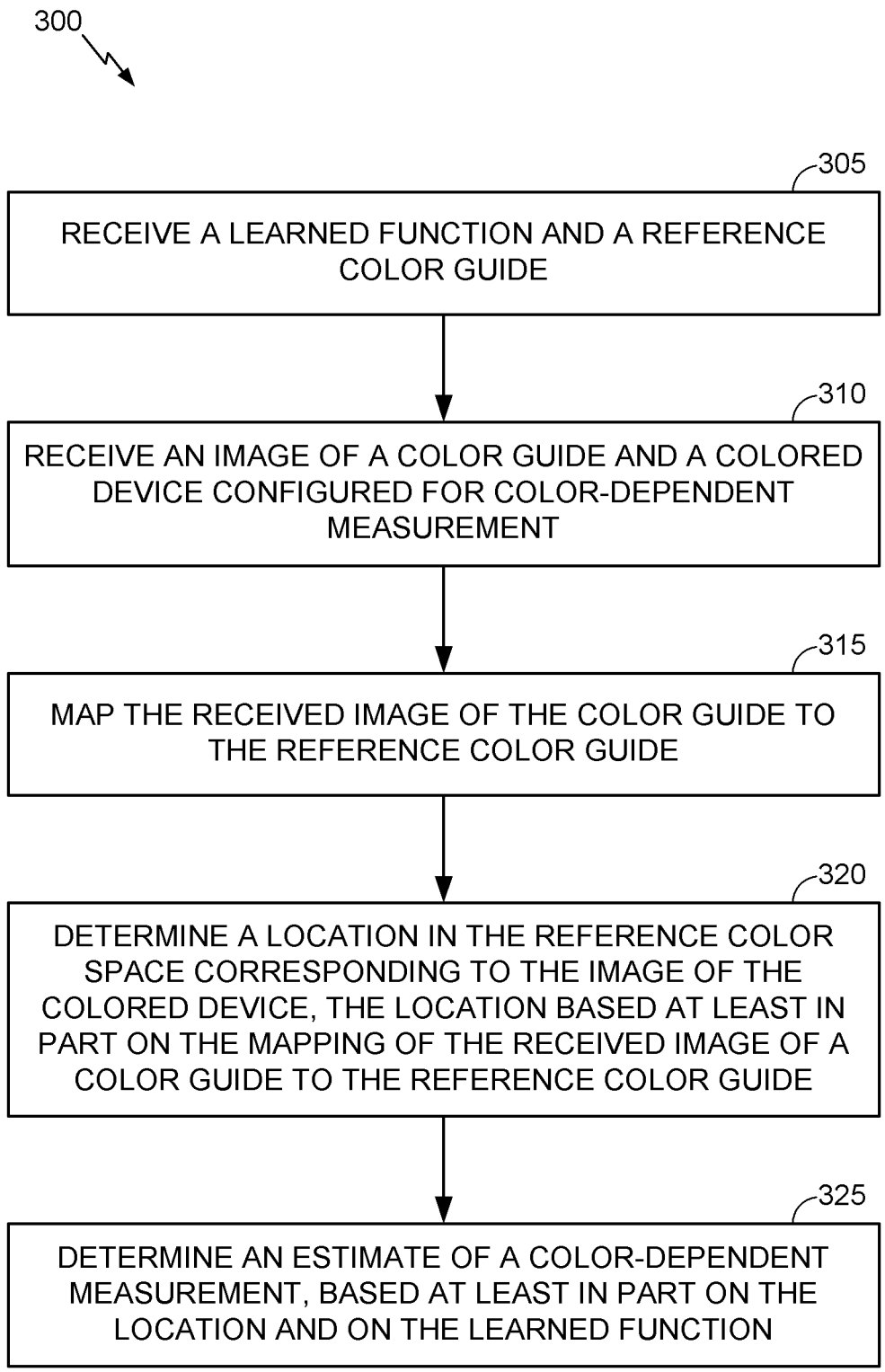
FIG. 3 is an illustration of a method for robust color estimation using a reference color grid.

FIG. 3 is an illustration of a method 300 for robust color estimation using a reference color grid. This method may be done on an electronic device, such as a wireless or mobile device. For example, this method may be done on a mobile phone or tablet device with a digital camera or other imaging apparatus.

Starting at a block 305, the electronic device receives a learned function and a reference color guide. For example, the color guide may be a reference color grid, or may be a printed material, such as a page from a magazine. For example, the electronic device may receive a learned function f(x), where x is a color in a reference color space, and where f(x) is a function to estimate a measurement measured by a color-dependent device, such as a concentration, based upon a color of a color-dependent device. For example, the learned function f(x) may be a function generated as in block 210 of FIG. 2. The electronic device also receives a reference color grid, which may contain a number of colors. These colors may be similar to colors which may be used in the learned function f(x). The reference color grid received may be a reference color grid that is generated using a method such as method 200 of FIG. 2. The reference color grid may be designed so that a correspondence between a testing color space and a reference color space can be found. For example, the reference color grid may comprise color information for each square on a printed reference color grid. This color information may be a color in a reference color space, the color corresponding to the color found in the printed and scanned version of the printed reference color grid. In some aspects, the means for receiving a learned function and a reference color guide may comprise a receiver.

The process 300 then moves to a block 310, wherein the electronic device receives an image of a color guide and a colored device configured for color-dependent measurement. The electronic device may receive this image from an image capture device, such as a digital camera. For example, the electronic device may be a mobile phone or other device with a digital camera, where the image is received from the digital camera of the device. In some aspects, the image of the color guide may be an image of a printed reference color grid. The colored device configured for color-dependent measurement may be a paper-based microfluidic device that has been exposed to a sample. In some aspects, the location of the colored device may be defined with respect to the image of the color guide. For example, the colored device may be configured to be placed in a certain position relative to the color guide. The process 300 may determine the location of the colored device based at least in part on the location of the image of the color guide. In some aspects, the means for receiving an image containing a color guide and a colored device configured for color-dependent measurement may comprise a receiver, such as a receiver connected to a digital imaging device.

Figure 5:
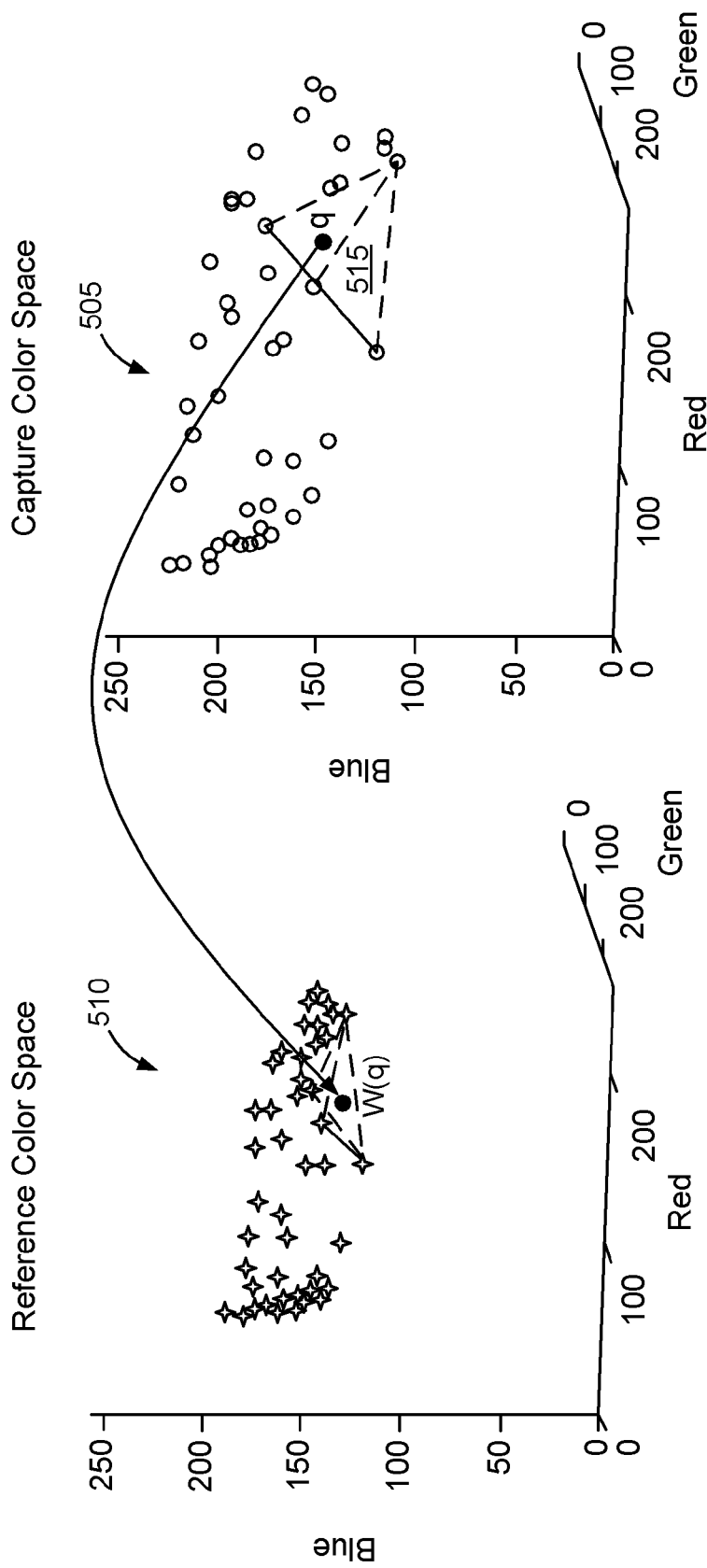
FIG. 5 is an illustration of an affine warping function which may be used to determine a location on the reference color space.

The process 300 then moves to a block 315, wherein the electronic device maps the received image of the color guide to the reference color guide. For example, the received image of the color guide may be an image that has been taken by a digital camera. For example, the image may contain a printed reference color grid. This image of the printed color grid may be used to determine color differences between the capture device being used, such as a digital camera on a mobile phone or other device, and between the colors of the reference color grid in the reference color space. For example, the learned function f(x) may be a function in a reference color space, where x is a color in the reference color space. Due to variations in capture equipment, environmental conditions and other elements, the colors in an image captured by one device, such as a testing device, may not be identical to those captured by another device, such as a reference device used to generate the learned function f(x) and to generate the reference color grid. Thus, it may be beneficial to provide a mapping of the colors of a testing device to that of a reference color space. For example, the mapping may comprise generating a warping function W(q), where q is a color in the testing or received color space, and where W(q) represents the same color in the reference color space. The warping function W(q) may be generated using any number of techniques based upon the image of the printed color grid and the reference color grid. For example, local affine warping may be used to map colors from a testing color space to a reference color space. Local affine warping may define a number of nearest colors in the color grid to a color q, and may use these nearest colors to estimate where in the reference color grid color q would be. Any number of colors may be used for this technique. For example, 1, 2, 3, 4, 5, 8, or 15 colors may be used in an affine warping function. FIG. 5 illustrates an affine warping function. In FIG. 5, four colors are used to calculate a value of the warping function W(q). In some aspects, the means for mapping the received image of the color guide to the reference color guide may comprise a processor, such as a processor configured to compare the colors of the image of the color grid and the reference color grid.

The process 300 then moves to a block 320, wherein the electronic device determines a location on the reference color space corresponding to the image of the color device, the location based at least in part on the mapping of the received image of a color guide to the reference color guide. For example, if the electronic device has generated a warping function W(q), as discussed above, the electronic device may determine a color of the colored device configured for color-dependent measurement. This color may be in the testing or received color space. This color may be determined by, for example, determining the area of the image corresponding to the colored device configured for color-dependent measurement. This color may be a color from this area of the image. This color may also be an average of an area of the image corresponding to the colored device configured for color-dependent measurement. The color of the colored device configured for color-dependent measurement may be assigned a value q. This value q may represent a color value in any color model such as RGB. The color of the colored device configured for color-dependent measurement may then be translated to the reference color space, thereby determining a location on the reference color space corresponding to the image of the color device. For example, the color of the colored device configured for color-dependent measurement q may be used in a warping function W(q), in order to determine a location on the reference color space. In some aspects, the means for determining a location in a reference color space corresponding to the image of the colored device, the location based at least in part on the mapping of the received image of the color guide to the reference color guide may comprise a processor configured to use a warping function. In some aspects, the means for determining a mapping function to convert a color from a captured color space to a reference color space, based at least in part on the received image of a color guide and the reference color guide may comprise a processor configured to determine a warping function. In some aspect, the means for using the mapping function to determine a color in the reference color space corresponding to a color of the image of the colored device in the captured color space may comprise a processor configured to use the warping function that has been determined.

The process 300 then moves to a block 325, wherein the electronic device determines a color-dependent measurement, based at least in part on the location and on the learned function. For example, the color-dependent measurement may be a concentration in a substance, such as in a patient's blood. This determination may be done in a number of ways. For example, if the electronic device has received a learned function f(x), and has created a warping function W(q), and has determined a color q of the colored device in a testing color space, determining an estimate of a color-dependent measurement may be calculated as f(W(q)). This may allow a testing device, such as a mobile phone equipped with a digital camera, to provide a robust estimation of a color-dependent measurement, despite the differences between capture devices and differences in lighting and other factors. In some aspects, the means for determining an estimate of a color-dependent measurement, based at least in part on the location in the reference color space and on the learned function may comprise a processor configured to use a learned function.

Figure 4:
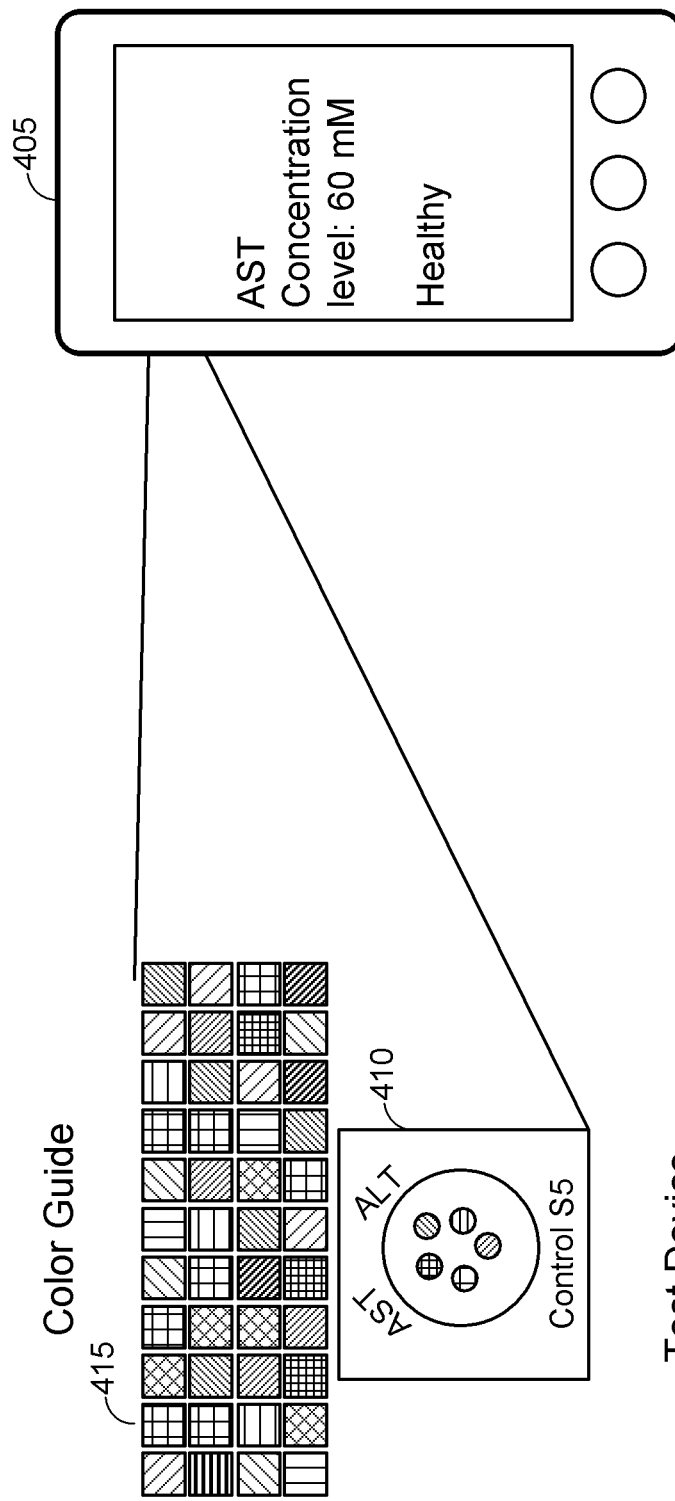
FIG. 4 is an illustration of an electronic device taking an image of a color device configured for color-dependent measurement and a reference color grid.

FIG. 4 is an illustration of an electronic device taking an image of a color device configured for color-dependent measurement and a reference color grid. In FIG. 4, an electronic device 405 may take an image of a colored device configured for color-dependent measurement 410 and a reference color grid 415. The electronic device 405 may include an image capture device, such as a digital camera. In some aspects, the electronic device 405 may be configured to receive an image of the colored device configured for color-dependent measurement 410 and the reference color grid 415. The electronic device 405 may be configured to use a method like method 300 in order to determine an estimate of a color-dependent measurement based on the image of the colored device configured for color-dependent measurement 410 and the reference color grid 415. In some aspects, the electronic device 405 may be configured to display an estimated measurement or measurements to a user. In some aspects, the electronic device 405 may be configured to transmit the measurement, such as transmitting the measurement to a medical professional. In other aspects, the electronic device 405 may be configured to transmit the measurement, and the images of a color device and a reference color grid.

FIG. 5 illustrates an affine warping function which may be used to determine a location on the reference color space. The right graph illustrates the colors found in a captured color grid 505. The left graph illustrates the colors of a reference color grid 510. The captured color grid 505 may be a captured image of the reference color grid 510. The colors in the captured color grid 505 may differ from those of the reference color grid 510 due to differences in the capture device used, lighting conditions, and other factors. In the captured color grid 505, one point q represents a captured color q 515 corresponding to a colored device configured for color-dependent measurement. The captured color q 515 may, for example, be an average of an area of a captured image, the area representing an area of the image which pictures the colored device configured for color-dependent measurement. The captured color q 515 may be converted to a reference color space as a reference color W(q) 520. In the illustrated affine warping technique, the nearest four colors to the captured color q 515 in the captured color grid 505 are found. In some aspects, other number of nearby colors may be used, rather than four colors. Based on these nearest four colors, and the corresponding four colors in the reference color grid 510, the reference color W(q) 520 is located. This reference color may be used in a learned function f(x), as discussed above, in order to provide an estimated measurement according to the techniques disclosed above.

EXAMPLES

In these examples, paper-based microfluidic devices were used. As with other color-based measuring devices, an accurate analysis of the device color from an image using computer vision algorithms is difficult. One reason for this is because the object color depends on the spectral and spatial distributions of the illumination. Following a Lambertian assumption, i.e. ignoring the specular reflections, the captured color channel $C \in \{Red, Green, Blue\}$, is obtained by:

$$C(x) = m(x) \int_w I(\lambda) \rho_c(\lambda) S(x, \lambda) d\lambda \quad (1)$$

where m(x) is the Lambertian shading, $I(\lambda)$ is the color of the light source, $\rho_c(\lambda)$ is the camera sensitivity function for the channel c, and $S(x,\lambda)$ is the surface reflectance.

In these examples, the paper-based microfluidic devices used are those designed by Diagnostics For All ("DFA") (Cambridge, Mass.), and used to measure AST enzyme levels in blood/serum samples. First, a function is learned to estimate the concentration levels from test device images captured with a reference capture device (scanner). The color variations of the device pixels are represented by partitioning the distribution of the pixels in the reference color space. An ideal color guide grid is obtained by quantizing this distribution into 5×5 color grids for a set of partitions. However, it is impossible to obtain this ideal guide due to nonlinear deformations that are applied by printer and capture devices. This is addressed by selecting those color grid cells that remain in a probable region of pixel color distribution. A representative subset of these cells are used to design the color guide.

To estimate the concentration level of a test device, one can use the learned color guide to establish a correspondence between the reference color space and testing color space. This allows invariance to color illuminant variations (color constancy) and various color gamut mappings of different capture devices. The mapped color pixels can be used to estimate the color of the pixels with respect to the reference color space. And the mapped pixel colors are input to the learned estimation function in the reference color space. Experimental results with a dataset of 120 devices show that the system can effectively be used for concentration estimation of AST devices.

This system may be easily and cheaply reproduced with a printer and scanner. The developed algorithms can be used to design application specific color guides, and to make color based inferences. This allows the mobile phone camera and processor in various applications in biology, chemistry and medicine that are based on precise analysis of the color of a device. In general, the system can also be used to estimate the color of an object or painting of the scene with reference colors.

Figure 6:
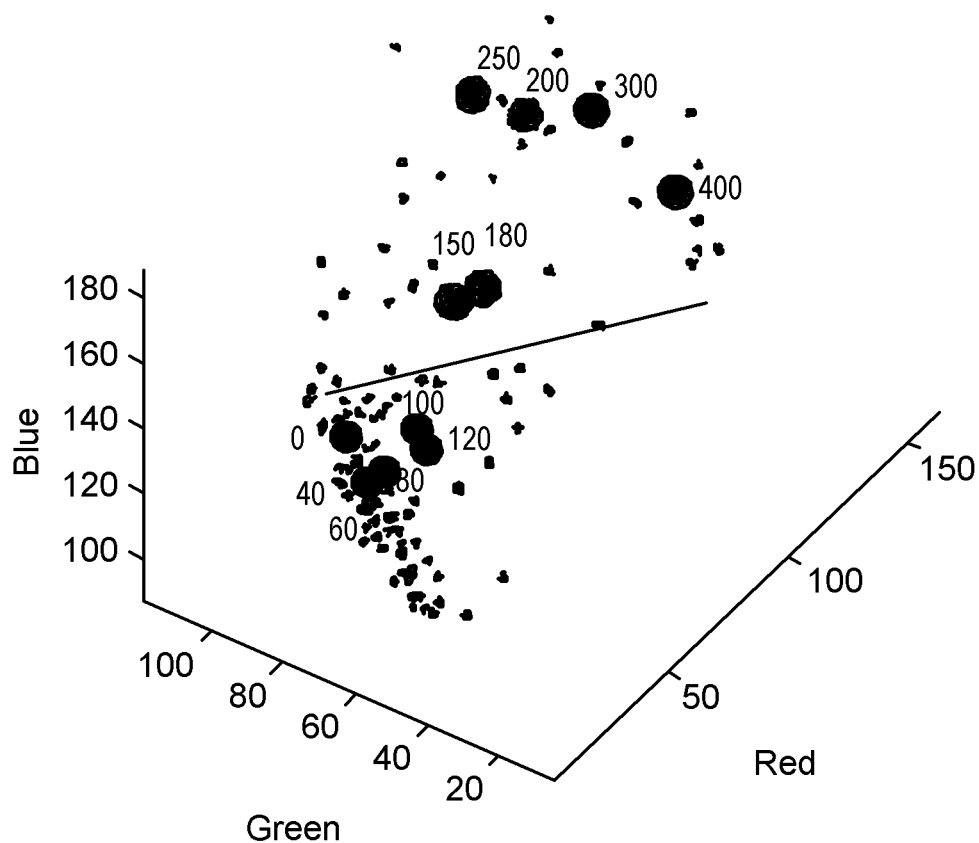
FIG. 6 is an illustration of a distribution of samples in a reference color space.

This first step of the method used is to learn a function and color variations within a training set. The goal is to estimate a function f(x) which provides an estimate of the concentration levels of a solution from the color of the test device cell, where x=(R, G, B), and where R, G, B are average red, green, and blue channel values in the cell, respectively. A linear regression solution for this function is given by $f(x)=w^T x+b$, where w can be estimated with least squares. This solution may also be extended to the nonlinear case by using the kernel trick. FIG. 6 illustrates a distribution of samples in a reference color space. The larger circles are the mean of the samples for the labeled concentration level. The line shows the solution estimated be the regression function.

In order to design a color grid that densely samples the distribution of colors in the scanner color space along the solution subspace, pixel values were grouped using a 20 bin histogram that partitions the solution subspace with equal intervals of bin centers. Each of these 20 bins is used to estimate the local distribution of the pixels. That is, the means $\mu_i$ and the covariance matrices $\Sigma_i$ are estimated in the orthogonal space to the solution subspace for the pixels that are in one of i={1,2 ..., 20} bins. Specifically, the covariance matrix is estimated by $$\Sigma_i = \frac{1}{N_i} \hat{X}_i \hat{X}_i^T,$$

where $\hat{X}_i$ is the projected $2 \times N_i$ sample matrix for $N_i$ samples in the $i^{th}$ histogram bin and obtained by projecting each sample in the bin $x_{ij}$ to the subspace orthogonal to the solution subspace, i.e. $\hat{x}_{ij}=W^{\perp T}(x_{ij}-\mu_i)$ and $W^{\perp T}w=0$. The covariance matrices obtained for the projected samples defines the variability of the samples orthogonal to the solution.

Figure 7:
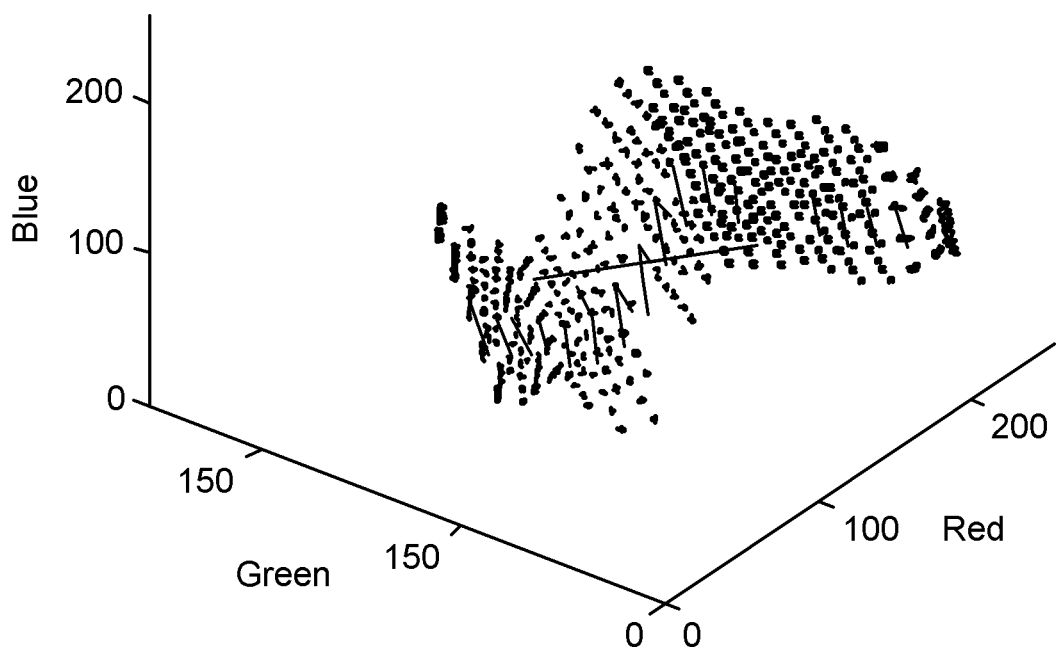
FIG. 7 is an illustration of an ideal grid for a color guide that can be used to represent the distribution of the pixels in the scanner color space.
Figure 8:
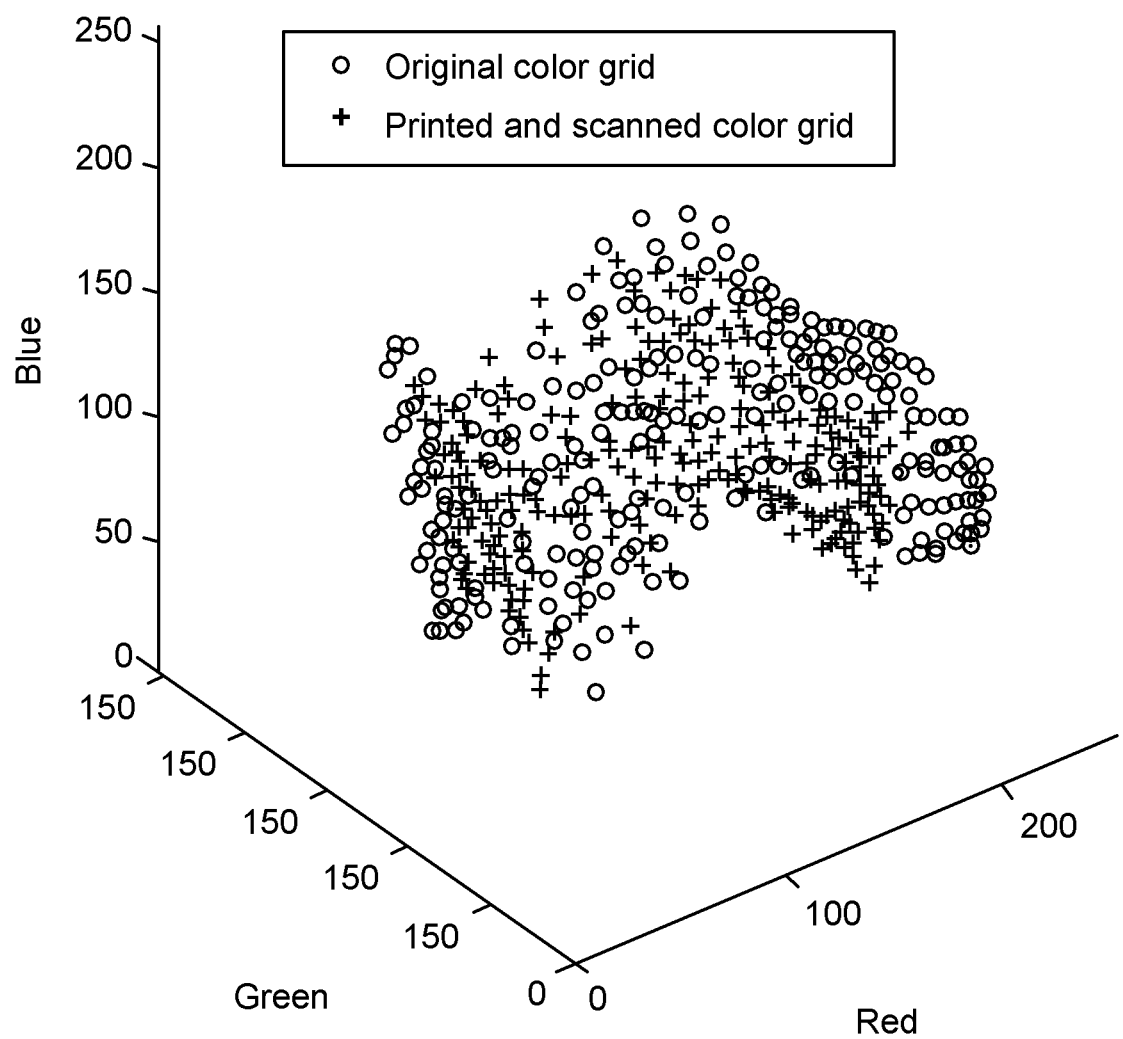
FIG. 8 is an illustration of mean color values of a printed and scanned grid and those of an ideal grid.

Next, an ideal grid for a color guide is designed. Using the 20 sets of samples labeled in the previous section, a 5×5 grids properly centered around the mean locations and scaled and rotated according to the covariance matrices are generated. FIG. 7 shows the ideal grid for a color guide that can be used to represent the distribution of the pixels in the scanner color space. However, due to the restricted color gamut of a printer, it is not possible to obtain exactly the same colors that we target in this grid. For example, FIG. 8 illustrates the mean color values of the printed and scanned grid and those of the ideal grid. Note that these values are not the same, due to the restricted color gamut of the printer.

Next, a subset of grid cells must be obtained. First, the grid cells that are outside of a feasible distance from the distribution of the original pixels are eliminated. To do this, a nearest mean location is calculated for each cell $c_j$ in the solution space using the formula $\arg\min_i \|w^T(c_j - \mu_i)\|$. It is assumed that the cell $c_j$ is assigned to part i, and a Mahalanobis distance from the corresponding center in the orthogonal subspace is calculated, using the formula $$d_M(c_j, \mu_i) = \|W^{\perp^T}(c_j - \mu_i)\|_{\Sigma_i} \quad (2)$$

Figure 9:
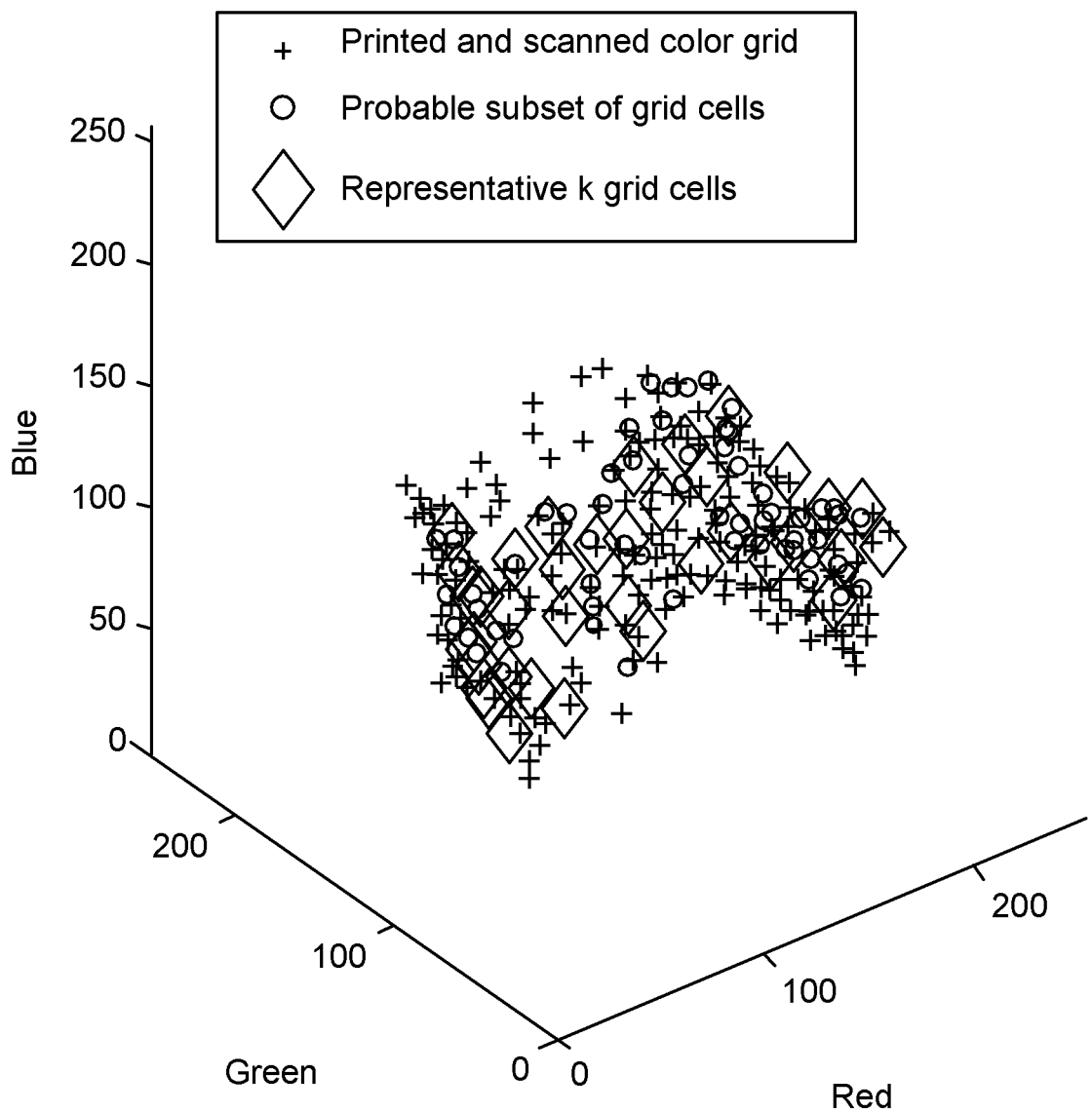
FIG. 9 is an illustration of chosen guide colors as black diamonds from a subset of probable grid cells.
Figure 10:
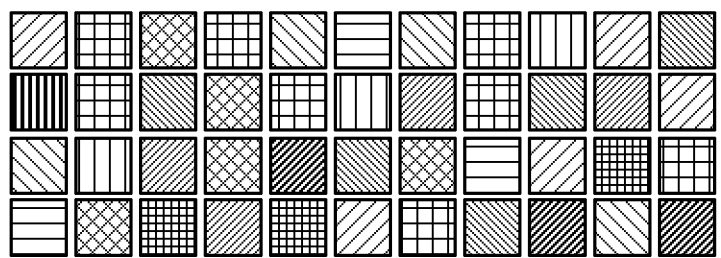
FIG. 10 is an illustration of an extracted color guide.

Grid cells which have $d_M < 2$ are selected as the potential cells. In order to create a compact color guide for the test device, a subset of these potential cells is selected. To do this, a k-means algorithm is run and k closest grid cells to the k=44 cluster centers are selected as the representative color guide cells. FIG. 9 illustrated these 44 guide colors as black diamonds. FIG. 10 illustrates the extracted color guide.

Next, the colors of the test device may be mapped to the reference color space. Various mapping algorithms could be used to find a nonlinear mapping between the reference and captured color guides. A simple algorithm is to estimate the average color of the test device cell pixels, q and find its nearest guide color to the color of the query cell pixel. The query color is then assigned to the corresponding color of the guide cell in the scanner space. We call this algorithm as the nearest neighbor assignment and refer to it as $W_1(.)$. Alternatively, the test device cell pixels may be mapped to the scanner color space and the average test device cell color can be calculated in the scanner space. This is referred as $W_2(.)$.

A more robust way of mapping can be obtained with local affine warping, as illustrated in FIG. 5. In this case, for each pixel in the query cell (q), 4 nearest guide colors are found and affine warp to the corresponding 4 guide colors in the scanner space is estimated. Next, the mapped pixels (W(q)) are tested, whether they are inside a probable region of the pixel distribution observed in the training set, i.e. if $d_M < 2$ (Eq. 2) accept the mapped pixel. The average of these pixels is calculated to find the average mapped cell color.

Using the designed color grid of FIG. 10, an experiment was conducted to determine that accuracy of this method. Each of the 120 test devices used in the training set were captured along with the color grid under outdoor illumination (1:30 PM under bright sunlight at 36.2° altitude and 206.3° azimuth east of north direction), using the camera from an Apple iPhone 4. The test devices and the color grid were placed on a flat surface, and the camera was pointed directly at the scene. The corners of the device images are detected and registered to extract the AST and ALT cell pixels. In addition, the trained grid corners are manually labeled and registered to extract the color of the guide cells.

A correspondence between the captured color grid and the grid colors in the reference (scanner) color space are established. The captured device cells colors are mapped to the reference color space and a learned function is used to estimate concentration level.

Figure 11:
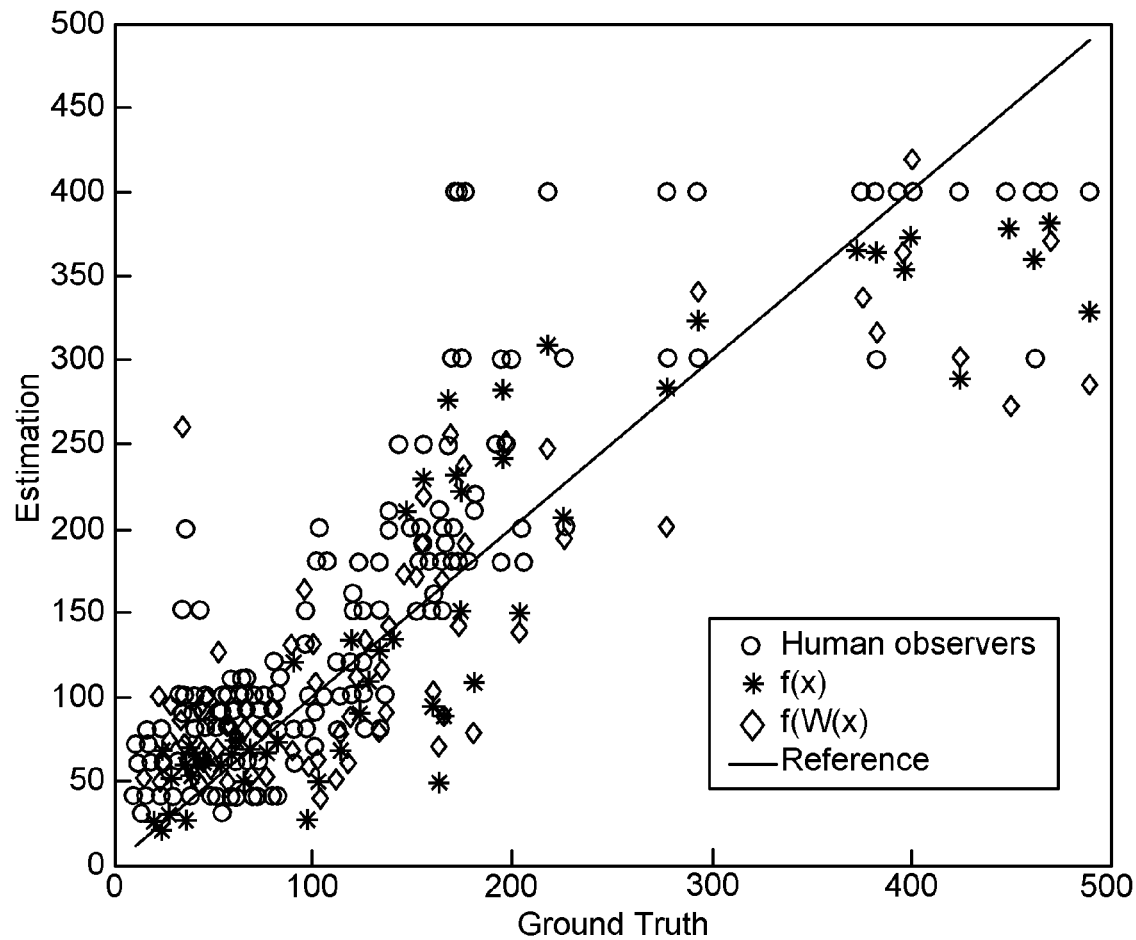
FIG. 11 is an illustration of estimates of concentration in an experiment based on various techniques and true concentration levels.

FIG. 11 shows the estimates based on various techniques and the true concentration levels, based on this analysis. Human observers correspond to concentration level estimates of the human observers based, on comparing the device colors to a color guide designed by DFA. Next, the results of f(x) are measurements based on the use of the linear regression function f(x), in the reference color space x. Finally, the estimates of f(W(x)) reflect the performance of the testing images captured by the Apple iPhone 4 in outdoor illumination, along with the learned regression function f(x). Finally, the line indicates an ideal relationship between the estimates and the true concentration level. From these results, it can be observed that the proposed system performs similarly to the original regression function with some additional errors for the device concentration levels less than 100 mM. This may be due to several reasons. First, as seen in FIG. 6, the dynamic range of color variations in this part of the color space is very small. Second, as seen in FIG. 8, the ideal color guide that is printed and scanned has restricted gamut in the corresponding section of the color space. Some additional error may be introduced due to manual registration of the test devices. These issues may be addressed in practice by using a printer and a capture device that have a larger color gamut than the one used in this experiment.

Table 1, below, shows the root mean square error (RMSE) values for each of the estimation procedures described above. In addition to the affine warping algorithm W(.), the nearest neighbor warping method $W_1(.)$ and warping the pixels using their nearest neighbor and calculating the average of the warped pixels in the reference color space $W_2(.)$ have also been tested. Table 1 shows the performance obtained with each of these algorithms. The performance of the system is comparable with the estimation performance of the human observes, while providing estimation of the continuous concentration levels.

TABLE 1

| RMSE | SK | JR | SJ | f(x) | f(W(x)) | f($W_1$(x)) | f($W_2$(x)) |
|---|---|---|---|---|---|---|---|
| AST | 46.1713 | 56.3547 | 45.3200 | 48.9209 | 54.6903 | 69.9156 | 70.1192 |

A second experiment has also been conducted, using DFA devices to detect ALT and AST enzyme levels in samples of patients. In this experiment, average RGB channel values in each cell of the testing devices are recorded, and the ground truth concentration levels are measured in a laboratory experiment. Formally, let $X = (x_1, x_2, \ldots, x_n)$ be a 3×n data matrix with the column vectors $x_i \in R^3 \; \forall i$ is the vector of average RGB channel values for the test device, and $y_i$ be the ground truth concentration level for patient i. Since the device concentrations are continuous variables, the estimation of the concentration level from the color of the cell can be formulated as a regression problem. That is, we would like to estimate the concentration level y, from the device color x (with an additional row of 1 for the bias term) with a linear projection A, y=Ax. The least squares estimation of A is given by $A = yX^T(XX^T)^{-1}$. The concentration level of a new observation t can be estimated by $$\hat{y} = \hat{A}t \quad (3)$$

The linear regression model can only handle linear cases, i.e. when the concentration levels is a linear combination of the color variations. In general, the color may change nonlinearly with respect to concentration variations. This requires nonlinear regression. This can be done by using a popular nonlinear function estimation technique known as the kernel trick. In this case, the solution is assumed to be in the span of the functions defined over the training set, that is $A=\Gamma\Phi^T$ where $\Phi=\Phi(X)$ are the functions defined over the training set and $\Gamma$ is the coefficient matrix. Now, the goal is to estimate the coefficient matrix in the equation, $y=\Gamma K$ where $K=\Phi(X)^T\Phi(X)$ is the positive semi-definite kernel matrix with each element corresponding to the inner product in the kernel space, i.e. $K(i,j)=\Phi(x_i)^T\Phi(x_j)$. While there are many possible selections for the kernel type, we chose radial basis function kernels, $$K(i,j)=\exp(-\|x_i-x_j\|^2/(2\sigma^2)) \quad (4)$$

with $\sigma$ is the kernel parameter to be selected. In this case, the observations are 1-dimensional and hence $\Gamma$ is a 1 by n vector and K is an n by n matrix. The coefficient vectors may be estimated using $\hat{\Gamma}=y(\Phi^T\Phi)^{-1}=yK^{-1}$. The concentration level of a test sample t can be estimated by, $$\hat{y}=\hat{\Gamma}\Phi^T\phi(t)=\sum_{i=1}^{n}\hat{\Gamma}_i k(x_i,t) \quad (5)$$

The linear model may not be powerful enough to correctly estimate the relation between the color levels and the concentration level. In this case, the nonlinear model should be used.

Figure 12:
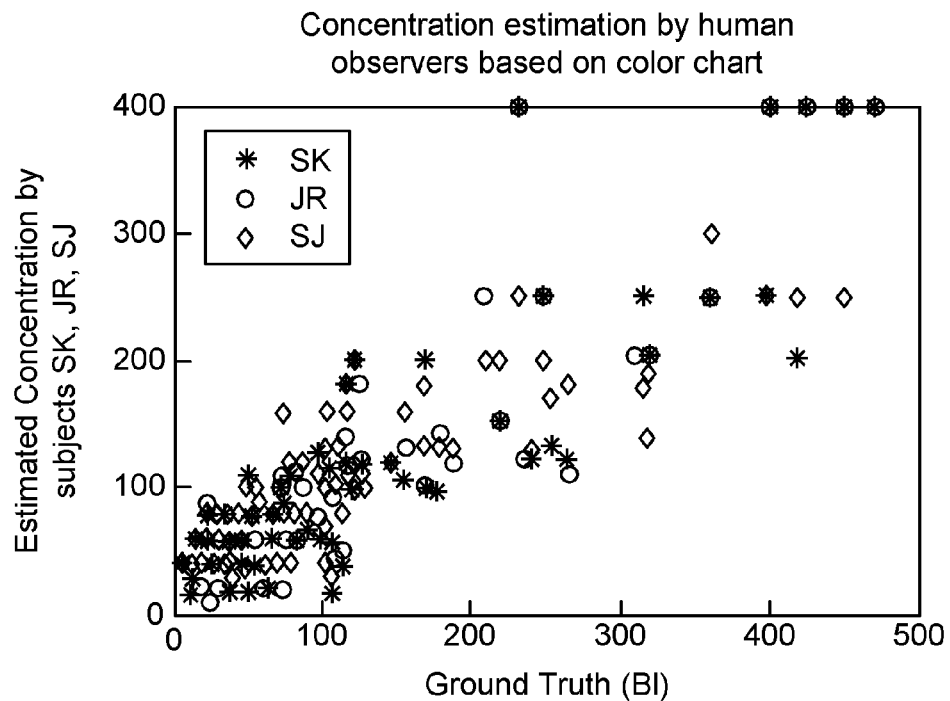
FIG. 12 is an illustration of results from human reads for a number of samples, taken by three individuals, for both ALT and AST levels.
Figure 12:
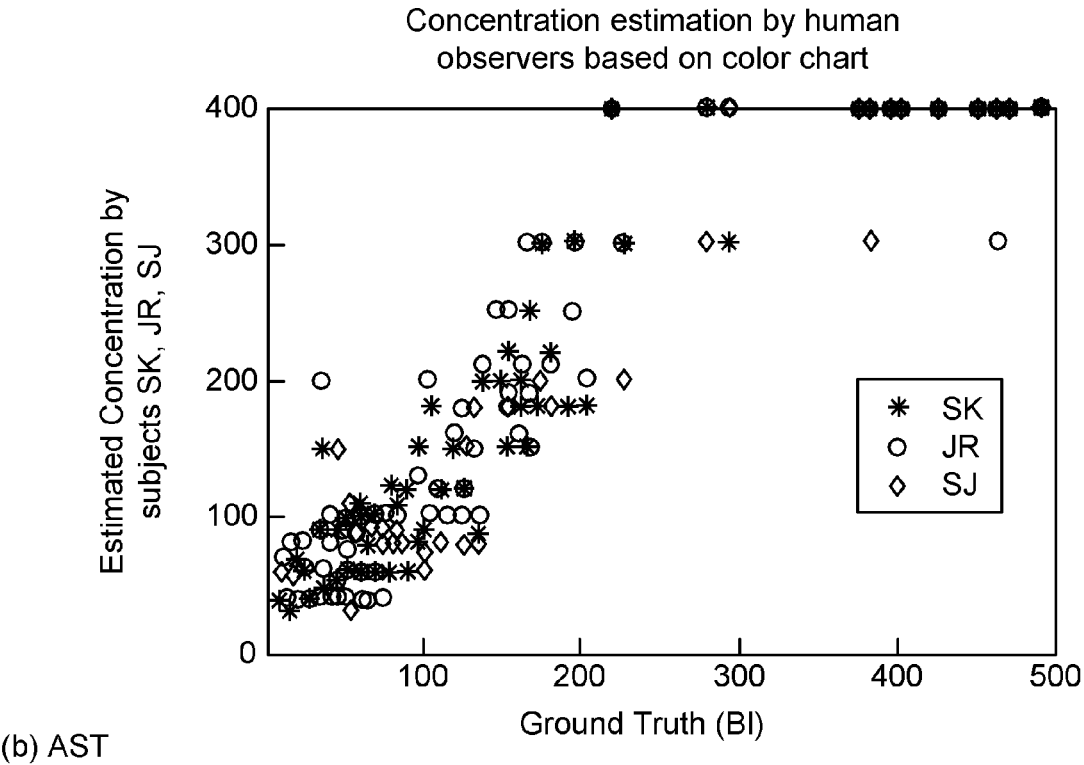

In this experiment, serum samples from 120 patients were measured for ALT and AST levels in a laboratory environment to obtain ground truth concentration levels. In addition, the paper-based devices were dipped into samples and three human observers were asked to classify the color of the devices to one of the ranks specified using provided color read guides. Results from these human reads for both ALT and AST, by three individuals, SK, JR, and SJ, are shown in FIG. 12.

Figure 13:
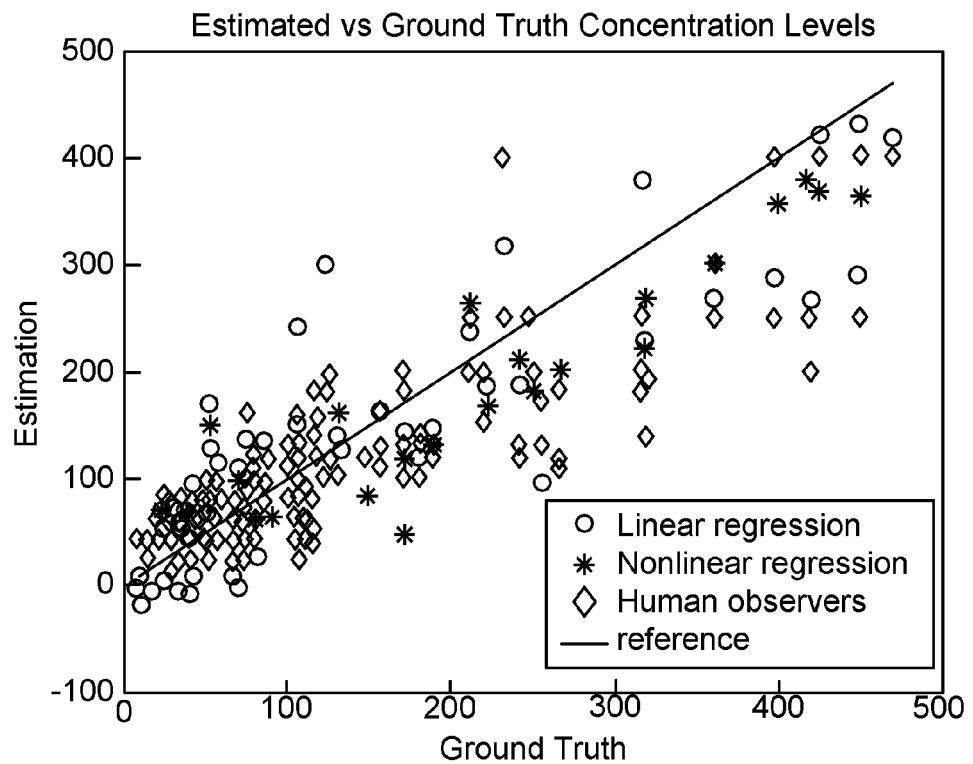
FIG. 13 is an illustration of ground truth levels and estimated values obtained by linear, nonlinear regression and human observers.
Figure 13:
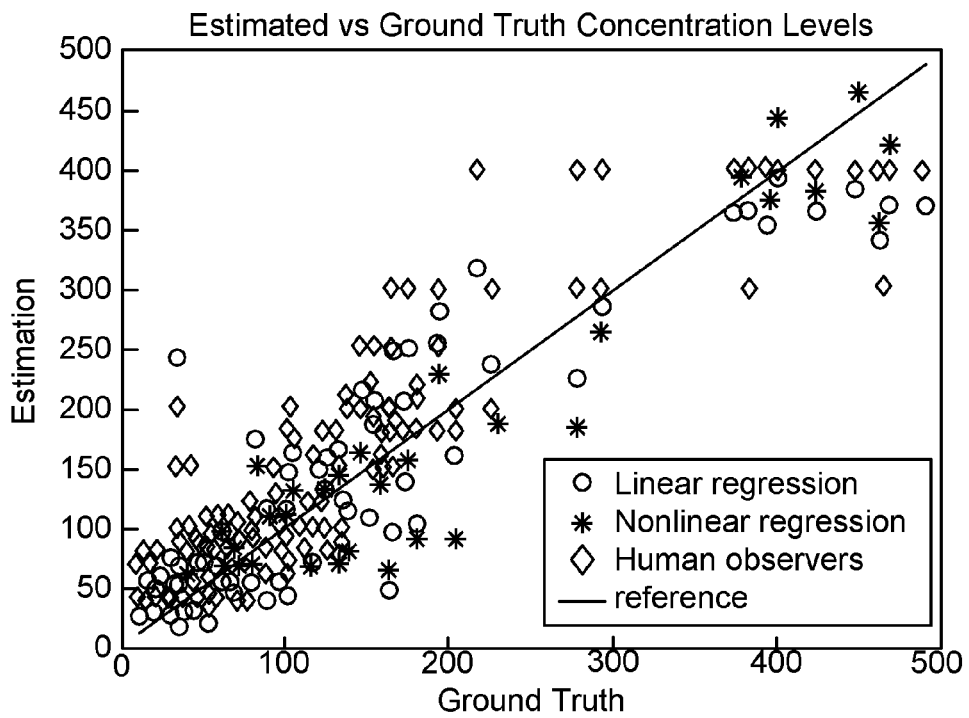

To evaluate the accuracy of the estimation algorithms, cross-validation tests were performed on the data. To do this, one of the test devices was left out of the data set, and the regression algorithms above were used with the remaining samples in order to predict the left-out sample. This was done for each sample in the dataset, and the square root of the mean square error was measured. FIG. 13 illustrates the ground truth levels against the estimated values obtained by linear, nonlinear regression and human observers. A reference line that shows the points of equality of ground truth and estimations is also plotted. It can be observed that the estimation algorithms usually provide better results and human observers. This is mainly because human observers are limited with the color charts which includes the labels of (0,40,60,80,100, 120,150,180,200,250,300,400) while the regression algorithms consider the continuous concentration level measurements.

TABLE 2

| RMSE | SK | JR | SJ | Linear Regression | Nonlinear Regression | Nearest Neighbor |
|---|---|---|---|---|---|---|
| ALT | 52.5279 | 49.9028 | 50.5562 | 59.4055 | 56.3963 | 77.5748 |
| AST | 46.1713 | 56.3547 | 45.3200 | 45.3953 | 46.3536 | 54.8230 |

Figure 14:
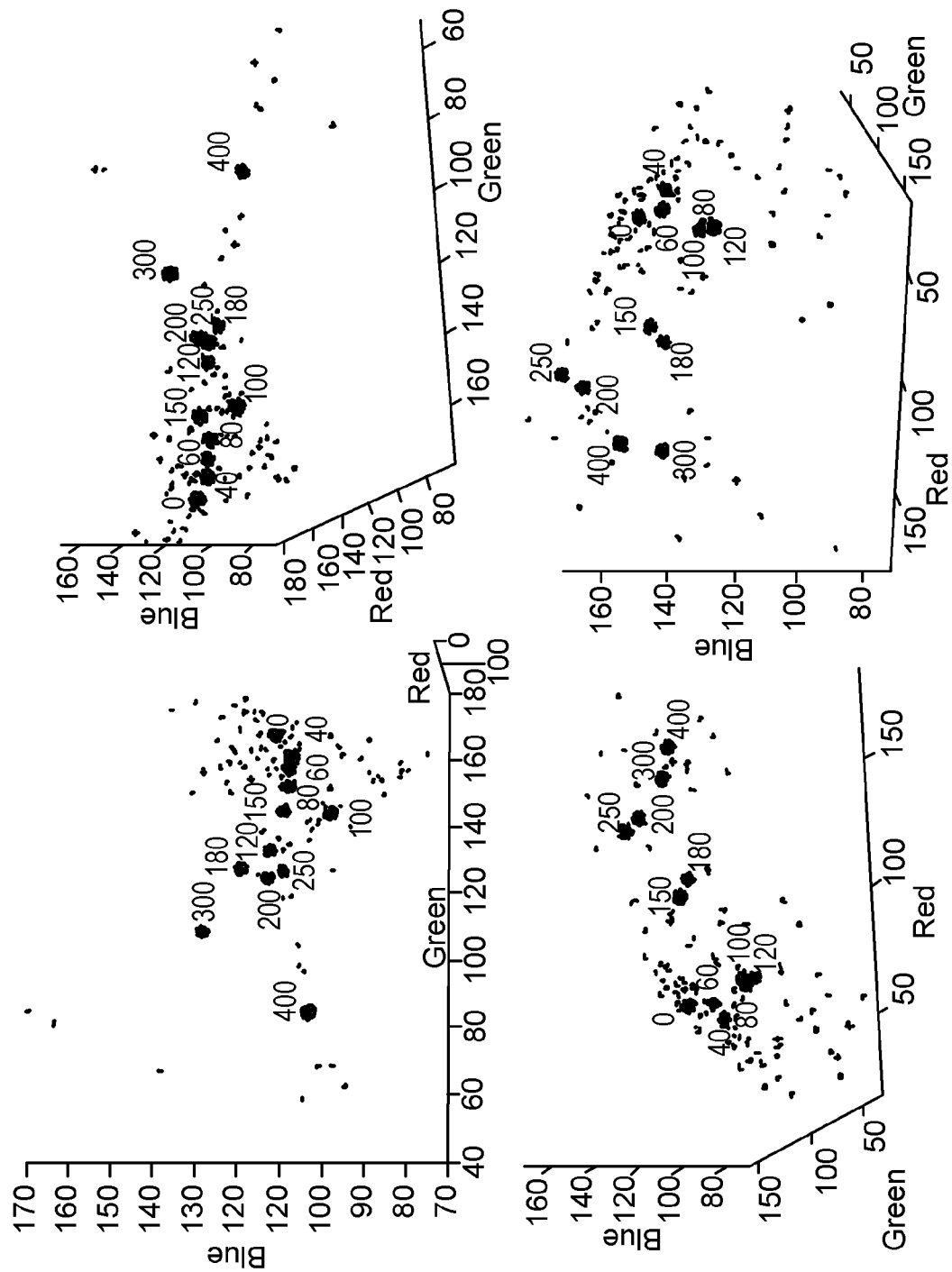
FIG. 14 is an illustration of RGB color plots for ALT (above) and AST (below) levels, with two colors plots of each, from different angles, shown.

Table 2 shows the root mean square errors (RMSE) for the three human observers, linear regression, nonlinear regression and estimation with the nearest neighbor. This is calculated by $$\sqrt{\frac{1}{n}\sum_{\forall i}(y_i-\hat{y}_i)^2}$$

between the ground truth and estimated labels. RMSE results show that linear regression is sufficient and performs similar or better than human observers for AST measurements. For ALT, nonlinear regression performs better than the linear regression and human observers perform slightly better than the regression algorithms. This may be due to inaccuracies in color estimation, and contraction of the test device color gamut resolution due to scanning. This may also be due to very small color variations between the 80-100 and the 120-180 levels. These very small color variations increase the possibility to generate large estimation errors due to even small inaccuracies in color estimation. This is also seen in the RGB color space plots in FIG. 14 where the samples for region 100-180 for ALT, the two lower graphs, are unordered and highly nonlinear. Thus, in these experiments, the regression algorithms were able to perform similarly to human observers, although the performance in ALT estimation in the color space for 80-100 and 120-180 was slightly poor, due to a small dynamic range in the color space.

Figure 15:
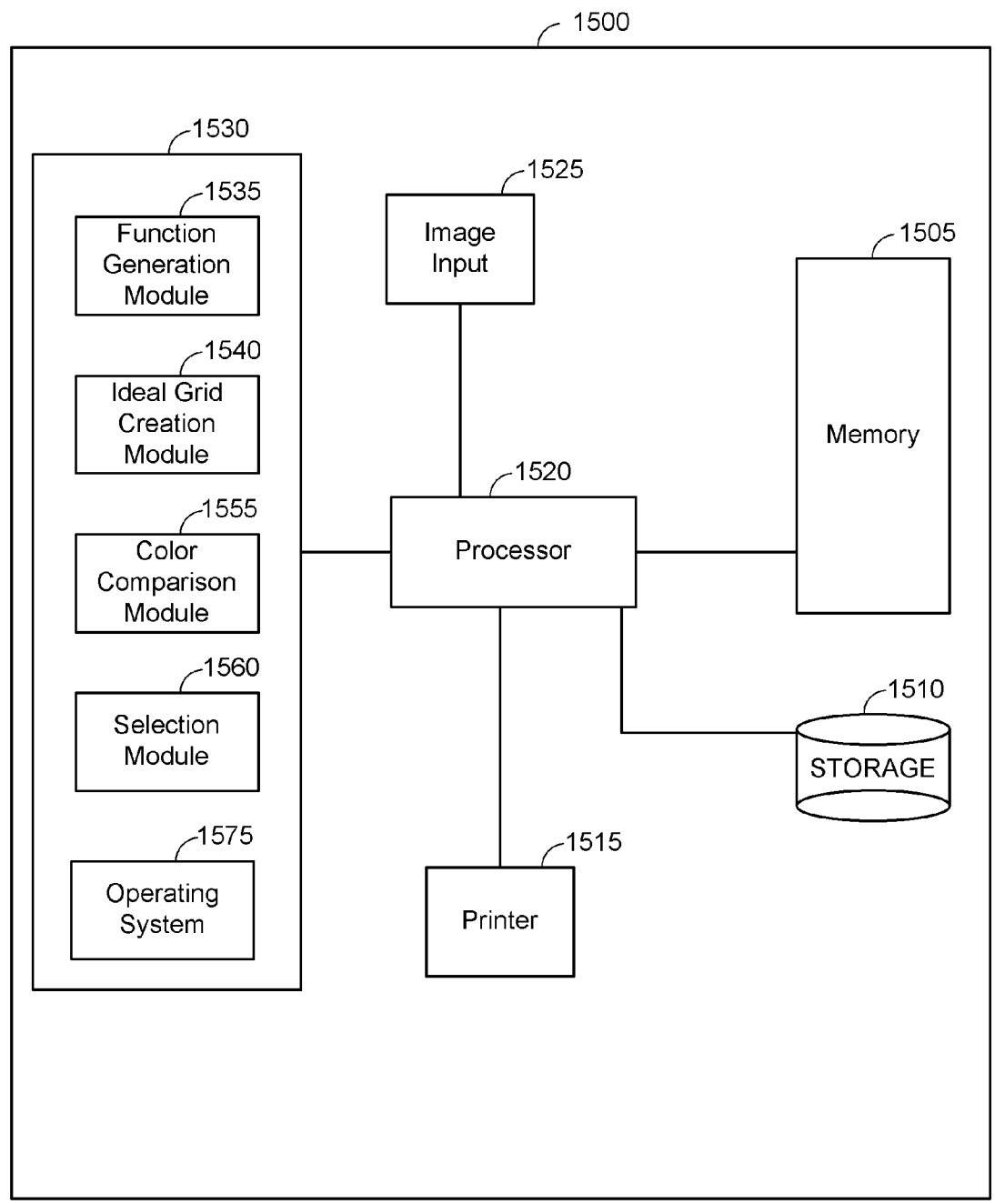
FIG. 15 depicts a device having separate components to include a processor, image input, and memory.

FIG. 15 depicts a high-level block diagram of a device 1500 having a set of components including a processor 1520 operatively coupled to a printer 1525. A working memory 1505, storage 1510, and memory 1530 are also in communication with and operative attached to the processor. Device 1500 may be a cell phone, desktop or laptop computer, or another device. A plurality of applications may be available to a user on device 1500.

Processor 1520 may be a general purpose processing unit or a processor specially designed for the disclosed methods. As shown, the processor 1520 is connected to a memory 1530 and a working memory 1505. In the illustrated embodiment, the memory 1530 stores function generation module 1535, ideal grid creation module 1540, color comparison module 1555, selection module 1560, and operating system 1575. These modules include instructions that configure the processor to perform various tasks. Working memory 1505 may be used by processor 1520 to store a working set of processor instructions contained in the modules of memory 1530. Alternatively, working memory 1505 may also be used by processor 1520 to store dynamic data created during the operation of device 1500.

As mentioned above, the processor 1520 is configured by several modules stored in the memories. For example, the function generation module 1535 may include instructions that configure the processor 1520 to receive a training set containing a plurality of elements, each element comprising a known measurement and a color of a measuring device in a reference color space. For example, this training set may be retrieved by the processor 1520 from the storage 1510. The function generation module 1535 may contain further instructions to configure the processor 1520 to generate a function to estimate a measurement, based on a color in a reference color space, based at least in part on the received training set.

The memory 1530 may also contain an ideal grid creation module 1540. The ideal grid creation module may contain instructions to configure the processor 1520 to generate an ideal color grid containing a number of cells for a color guide configured to sample the reference color space with respect to the learned function and the distribution of colors within the training set.

The device 1500 may also include a printer 1515 and an image input 1525. For example, the ideal grid creation module 1540 may contain instruction to configure the processor to use the printer 1515 to print an ideal color grid, and may contain further instructions to configure the processor to receive the printed ideal color grid from an image input 1525. For example, the image input 1525 may be a scanner or a digital camera. In some aspects, the printer 1515 and the image input 1525 may be connected to the processor via a network.

The device 1500 may also include a color comparison module 1555 and a selection module 1560. The color comparison module 1555 may contain instructions which may configure the processor 1520 to compare colors from an ideal color grid with colors received on a printed color grid via the image input 1525. The selection module 1560 may contain instructions that may configure the processor 1520 to select a subset of the colors from the printed color grid to be used on a reference color grid. For example, the selection module 1560 may receive information from the color comparison module 1555 regarding the colors on the printed ideal color grid, and may use this information along with information regarding the reference color space, which may be stored in the memory 1505 or in the storage 1510, in order to determine a subset of colors from the ideal color grid which may be suitable for the reference color grid.

Operating system module 1575 configures the processor to manage the memory and processing resources of device 1500. For example, operating system module 1575 may include device drivers to manage hardware resources such as the printer 1515, storage 1510, or image input 1525. Therefore, in some embodiments, instructions contained in modules discussed above may not interact with these hardware resources directly, but instead interact through standard subroutines or APIs located in operating system component 1575. Instructions within operating system 1575 may then interact directly with these hardware components.

Processor 1520 may write data to storage module 1510. While storage module 1510 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

FIG. 15 depicts a device having separate components to include a processor, image input, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 15 illustrates two memory components, to include memory component 1530 having several modules, and a separate memory 1505 having a working memory, one with skill in the art would recognize several embodiments utilizing different memory architectures. For example, a design may utilize ROM or static RAM memory for the storage of processor instructions implementing the modules contained in memory 1530. Alternatively, processor instructions may be read at system startup from a disk storage device that is integrated into device 1500 or connected via an external device port. The processor instructions may then be loaded into RAM to facilitate execution by the processor. For example, working memory 1505 may be a RAM memory, with instructions loaded into working memory 1505 before execution by the processor 1520.

Figure 16:
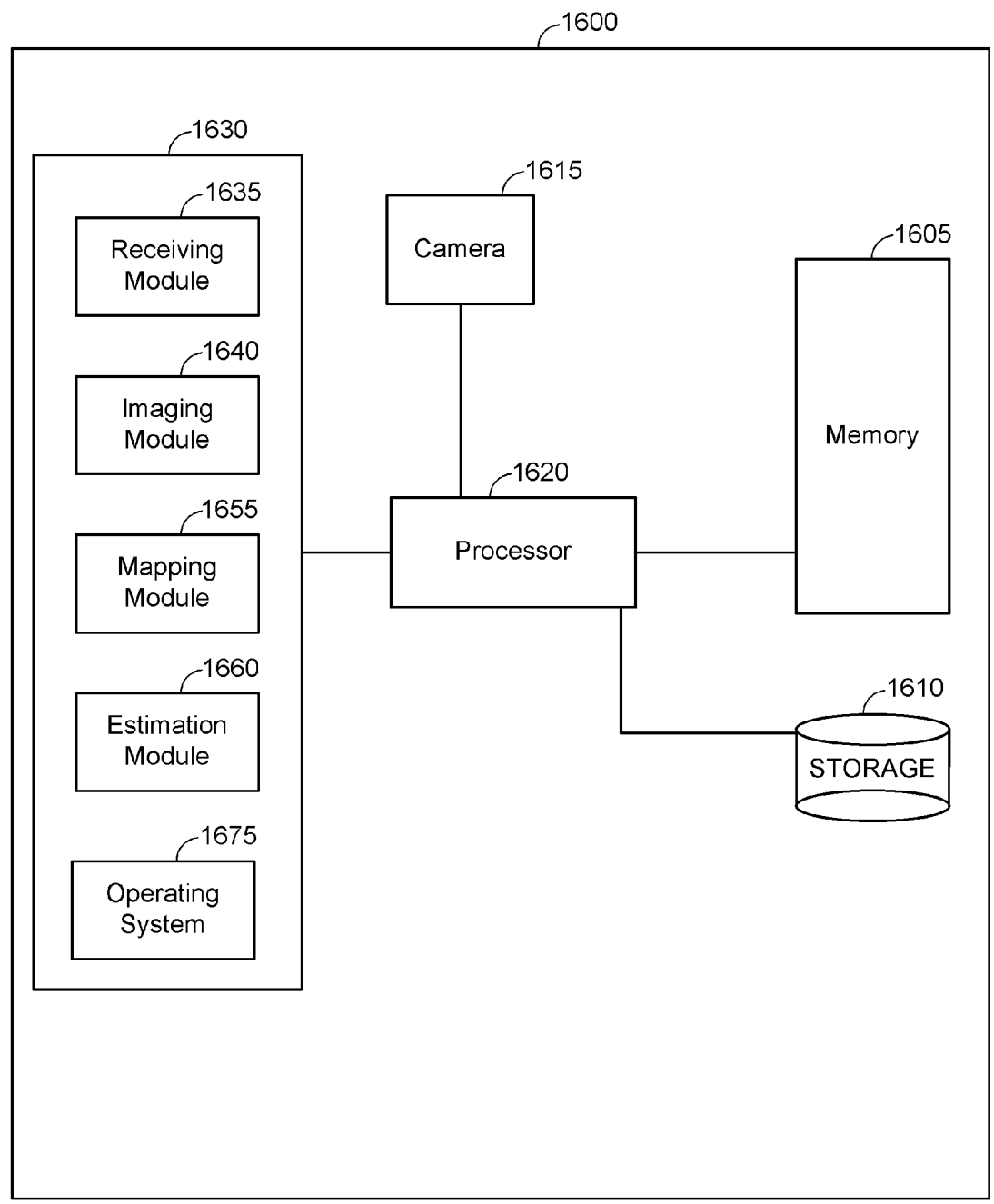
FIG. 16 depicts a high-level block diagram of a device having a set of components including a processor operatively coupled to a camera.

FIG. 16 depicts a high-level block diagram of a device 1600 having a set of components including a processor 1620 operatively coupled to a camera 1615. A working memory 1605, storage 1610, and memory 1630 are also in communication with and operative attached to the processor. Device 1600 may be a cell phone, desktop or laptop computer, or another device. A plurality of applications may be available to a user on device 1600.

Processor 1620 may be a general purpose processing unit or a processor specially designed for the disclosed methods. As shown, the processor 1620 is connected to a memory 1630 and a working memory 1605. In the illustrated embodiment, the memory 1630 stores receiving generation module 1635, ideal grid creation module 1640, color comparison module 1555, selection module 1560, and operating system 1575. These modules include instructions that configure the processor to perform various tasks. Working memory 1605 may be used by processor 1620 to store a working set of processor instructions contained in the modules of memory 1630. Alternatively, working memory 1605 may also be used by processor 1620 to store dynamic data created during the operation of device 1600.

As mentioned above, the processor 1620 is configured by several modules stored in the memories. For example, the receiving module 1635 may include instructions that configure the processor 1620 to receive a learned function and a reference color grid. In some aspect, the processor may receive the learned function and the reference control grid from the storage 1610.

The memory 1630 may also contain an imaging module 1640. The imaging module 1640 may contain instructions that configure the processor 1620 to receive an image containing a color grid and a colored device configured for color-dependent measurement from a camera 1615. For example, the imaging module 1640 may contain instructions that display an interface to a user, allowing a user to take an image of a measuring device and a color grid. The imaging module may contain further instructions to configure the processor 1620 to locate a portion of the image corresponding to the color grid and a portion corresponding to the image of the colored device.

The memory 1630 may also contain a mapping module 1655. The mapping module 1655 may be configured to receive the image of the color grid from the imaging module 1640 and the received color grid from the receiving module 1635. The mapping module 1655 may contain instructions to configure the processor 1620 to determine a mapping of the colors of the image of the color grid to the colors of the reference color grid. For example, this mapping may use local affine warping, as above.

The memory 1630 may also contain an estimation module 1660. The estimation module 1660 may contain instructions to configure the processor 1620 to estimate a color-dependent measurement, based at least in part on the mapping of the colors and on the received learned function. The estimation module 1660 may be configured to receive the mapping of the colors from the mapping module 1655 and may be further configured to receive the learned function from the receiving module 1635.

Operating system module 1675 configures the processor to manage the memory and processing resources of device 1600. For example, operating system module 1675 may include device drivers to manage hardware resources such as the camera 1615, storage 1610, or image input 1625. Therefore, in some embodiments, instructions contained in modules discussed above may not interact with these hardware resources directly, but instead interact through standard subroutines or APIs located in operating system component 1675. Instructions within operating system 1675 may then interact directly with these hardware components.

Processor 1620 may write data to storage module 1610. While storage module 1610 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

FIG. 16 depicts a device having separate components to include a processor, camera, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 16 illustrates two memory components, to include memory component 1630 having several modules, and a separate memory 1605 having a working memory, one with skill in the art would recognize several embodiments utilizing different memory architectures. For example, a design may utilize ROM or static RAM memory for the storage of processor instructions implementing the modules contained in memory 1630. Alternatively, processor instructions may be read at system startup from a disk storage device that is integrated into device 1600 or connected via an external device port. The processor instructions may then be loaded into RAM to facilitate execution by the processor. For example, working memory 1605 may be a RAM memory, with instructions loaded into working memory 1605 before execution by the processor 1620.

While the present disclosure has primarily discussed determining a measurement based on color, the techniques described herein can be used for other purposes as well. Indeed, these techniques may be used in any area which can use accurate color measurement. The methods of the present disclosure may be used to provide an accurate color measurement regardless of lighting conditions and capture device, which may be valuable in a number of fields. The methods of the present disclosure may also be done on relatively inexpensive and common mobile devices, rather than requiring specialized equipment. The methods of the present invention may also be used for robust color measurement using reference charts or other printed material with known colors, such as magazine pages.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-5 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method running on a processor for using a color guide to estimate a color-dependent measurement, the method comprising:
receiving a learned function and a reference color guide;
receiving an image, wherein the image comprises a color guide and a colored device configured for color-dependent measurement;
mapping the received image of the color guide to the reference color guide;
determining a location in a reference color space corresponding to the image of the colored device, the location based at least in part on the mapping of the received image of the color guide to the reference color guide; and
determining an estimate of a color-dependent measurement, based at least in part on the location in the reference color space and on the learned function.

2. The method of claim 1, wherein the learned function is a function configured to estimate the color-dependent measurement based at least on a color in the reference color space.

3. The method of claim 1, wherein receiving the image of the color guide and the colored device configured for the color-dependent measurement further comprises extracting a color of a measurement area of the colored device configured for color-dependent measurement based upon the received image.

4. The method of claim 1, wherein determining the location in the reference color space comprises:
determining a warp function to convert a color from a captured color space to the reference color space, based at least in part on the received image of the color guide and the reference color guide; and
using the warp function to determine a color in the reference color space corresponding to a color of the image of the colored device in the captured color space.

5. The method of claim 1, wherein the reference color guide comprises at least one of a printed material with known colors and a reference color grid.

6. A non-transitory, computer readable medium comprising instructions that when executed cause a processor in a device to perform a method of using a color guide to estimate a color-dependent measurement, the method comprising:
receiving a learned function and a reference color guide;
receiving an image, wherein the image comprises a color guide and a colored device configured for color-dependent measurement;
mapping the received image of the color guide to the reference color guide;
determining a location in a reference color space corresponding to the image of the colored device, the location based at least in part on the mapping of the received image of the color guide to the reference color guide; and
determining an estimate of a color-dependent measurement, based at least in part on the location in the reference color space and on the learned function.

7. The non-transitory, computer readable medium of claim 6, wherein the learned function is a function configured to estimate the color-dependent measurement based at least on a color in the reference color space.

8. The non-transitory, computer readable medium of claim 6, wherein receiving the image of the color guide and the colored device configured for the color-dependent measurement further comprises extracting a color of a measurement area of the colored device configured for color-dependent measurement based upon the received image.

9. The non-transitory, computer readable medium of claim 6, wherein determining the location in the reference color space comprises:
determining a warp function to convert a color from a captured color space to the reference color space, based at least in part on the received image of the color guide and the reference color guide; and
using the warp function to determine a color in the reference color space corresponding to a color of the image of the colored device in the captured color space.

10. The non-transitory, computer readable medium of claim 6, wherein the reference color guide comprises at least one of a printed material with known colors and a reference color grid.

11. An electronic device having a processor, comprising:
means running on the processor for receiving a learned function and a reference color guide;
means running on the processor for receiving an image, wherein the image comprises a color guide and a colored device configured for color-dependent measurement;
means running on the processor for mapping the received image of the color guide to the reference color guide;
means running on the processor for determining a location in a reference color space corresponding to the image of the colored device, the location based at least in part on the mapping of the received image of the color guide to the reference color guide; and
means running on the processor for determining an estimate of a color-dependent measurement, based at least in part on the location in the reference color space and on the learned function.

12. The electronic device of claim 11, wherein the learned function is a function configured to estimate the color-dependent measurement based at least on a color in the reference color space.

13. The electronic device of claim 11, wherein the means running on the processor for receiving the image of the color guide and the colored device configured for the color-dependent measurement further comprises means for extracting a color of a measurement area of the colored device configured for color-dependent measurement based upon the received image.

14. The electronic device of claim 11 wherein means for determining the location in the reference color space comprises:
means for determining a warp function to convert a color from a captured color space to the reference color space, based at least in part on the received image of the color guide and the reference color guide; and
means for using the warp function to determine a color in the reference color space corresponding to a color of the image of the colored device in the captured color space.

15. The electronic device of claim 11, wherein the reference color guide comprises at least one of a printed material with known colors and a reference color grid.

16. An electronic device, comprising:
a memory; and
a processor configured to:
receive a learned function and a reference color guide from the memory; and
receive an image, wherein the image comprises a color guide and a colored device configured for color-dependent measurement;
map the received image of the color guide to the reference color guide;
determine a location in a reference color space corresponding to the image of the colored device, the location based at least in part on the mapping of the received image of the color guide to the reference color guide; and
determine an estimate of a color-dependent measurement, based at least in part on the location in the reference color space and on the learned function.

17. The electronic device of claim 16, wherein the learned function is a function configured to estimate the color-dependent measurement based at least on a color in the reference color space.

18. The electronic device of claim 16, wherein the processor is configured to receive the image of the color guide and the colored device configured for color-dependent measurement, which further comprises being configured to extract the color of a measurement area of the colored device configured for color-dependent measurement based upon the received image.

19. The electronic device of claim 16, wherein the processor is configure to determine the location in the reference color space, comprising being configured to:
determine a warp function to convert a color from a captured color space to the reference color space, based at least in part on the received image of the color guide and the reference color guide; and
use the warp function to determine a color in the reference color space corresponding to a color of the image of the colored device in the captured color space.

20. The electronic device of claim 16, wherein the device comprises a mobile phone.

21. The electronic device of claim 16, wherein the reference color guide is at least one of a printed material with known colors and a reference color grid.

22. An electronic method of generating a color grid using a processor, comprising:
receiving a training set containing a plurality of elements, each element comprising a known measurement and a color of a measuring device in a reference color space;
learning a function to estimate a measurement based on a color in the reference color space, the learned function based, at least in part, on the received training set; and
creating a reference color grid containing a number of cells for a color guide, the reference color grid configured to sample the reference color space with respect to the learned function and a distribution of colors within the training set.

23. The method of claim 22, wherein creating the reference color grid comprises:
providing an ideal color grid for the color guide containing a number of colors in the reference color space;
printing the ideal color grid;
capturing the printed ideal color grid;
determining a difference between the colors on the printed and scanned or captured ideal color grid and a distribution of colors on the ideal color grid; and
selecting a subset of the colors from the printed and captured ideal color grid for the reference color grid based at least in part on the difference between the colors on the printed and captured ideal color grid and the distribution of colors on the ideal color grid.

24. The method of claim 23, wherein capturing the printed ideal color grid comprises scanning the printed ideal color grid.

25. The method of claim 22, wherein the known measurement comprises a concentration.

26. An electronic device, comprising:
a memory; and
a processor configured to:
receive a training set containing a plurality of elements from the memory, each element comprising a known measurement and a color of a measuring device in a reference color space;
learn a function to estimate a measurement based on a color in the reference color space, the learned function based, at least in part, on the received training set; and
create a reference color grid containing a number of cells for a color guide, the reference color grid configured to sample the reference color space with respect to the learned function and a distribution of colors within the training set.

27. The electronic device of claim 26, wherein the processor is configured to create the reference color grid, comprising being configured to:
provide an ideal color grid for the color guide containing a number of colors in the reference color space;
printing the ideal color grid;
capturing the printed ideal color grid;
determine a difference between the colors on the printed and captured ideal color grid and a distribution of colors on the ideal color grid; and
select a subset of the colors from the printed and captured ideal color grid for the reference color grid based at least in part on the difference between the colors on the printed and captured ideal color grid and the distribution of colors on the ideal color grid.

28. The electronic device of claim 27, wherein the processor is configured to capture the printed ideal color grid using a scanner.

29. The electronic device of claim 26, wherein the known measurement comprises a concentration.

* * * * *